(12) United States Patent
Zhang et al.

(10) Patent No.: US 8,949,217 B2
(45) Date of Patent: Feb. 3, 2015

(54) SERVER BOOKMARKS

(75) Inventors: Ying Zhang, Palo Alto, CA (US);
Jeffrey Korn, New York, NY (US)

(73) Assignee: Google Inc., Mountain View, CA (US)

( * ) Notice: Subject to any disclaimer, the term of this patent is extended or adjusted under 35 U.S.C. 154(b) by 1446 days.

(21) Appl. No.: 11/327,644

(22) Filed: Jan. 9, 2006

(65) Prior Publication Data
US 2008/0010286 A1 Jan. 10, 2008

(51) Int. Cl.
*G06F 7/00* (2006.01)
*G06F 17/30* (2006.01)

(52) U.S. Cl.
CPC .............................. *G06F 17/30884* (2013.01)
USPC ...................................................... 707/710

(58) Field of Classification Search
USPC ........................................................ 707/710
See application file for complete search history.

(56) References Cited

U.S. PATENT DOCUMENTS

| | | | |
|---|---|---|---|
| 6,037,934 A * | 3/2000 | Himmel et al. ............... 715/760 |
| 6,212,522 B1 * | 4/2001 | Himmel et al. ................. 707/10 |
| 6,493,702 B1 * | 12/2002 | Adar et al. ......................... 707/3 |
| 6,718,365 B1 | 4/2004 | Dutta |
| 7,028,032 B1 * | 4/2006 | Diedrich et al. ................ 707/10 |
| 7,031,961 B2 | 4/2006 | Pitkow et al. |
| 2002/0016786 A1 * | 2/2002 | Pitkow et al. ..................... 707/3 |
| 2002/0099784 A1 * | 7/2002 | Tran ............................... 709/212 |
| 2002/0143770 A1 | 10/2002 | Schran et al. |
| 2004/0107296 A1 * | 6/2004 | Donker et al. ................. 709/245 |
| 2004/0139178 A1 * | 7/2004 | Mendez et al. ................ 709/220 |
| 2005/0131866 A1 * | 6/2005 | Badros et al. ...................... 707/3 |
| 2006/0004799 A1 * | 1/2006 | Wallender ..................... 707/100 |
| 2006/0265381 A1 * | 11/2006 | Altaf et al. ....................... 707/10 |
| 2007/0100797 A1 | 5/2007 | Thun et al. |
| 2009/0030876 A1 | 1/2009 | Hamilton |

OTHER PUBLICATIONS

Co-pending U.S. Appl. No. 11/536,932, entitled "Bookmarks and Rankings", Inventor(s): Oren Zamir et al, filed: Sep. 29, 2006.

* cited by examiner

*Primary Examiner* — Robert Beausoliel, Jr.
*Assistant Examiner* — Nicholas Allen
(74) *Attorney, Agent, or Firm* — Harrity & Harrity, LLP

(57) ABSTRACT

A system receives, at a server, an action request from a client associated with bookmarks, where the bookmarks identify user designated documents. The system accesses bookmark records stored at the server based on the action request and acting on the bookmark records in a manner specified by the action request.

15 Claims, 39 Drawing Sheets

SERVER BOOKMARKS

BACKGROUND

1. Field of the Invention

Implementations described herein relate generally to document browsing and, more particularly, to storing bookmarks related to browsed documents on a server.

2. Description of Related Art

"Bookmarks" or "favorites" are typical ways for a browser executed at a client to remember documents (e.g., web pages) that a user has visited when browsing documents located on a network, such as, for example, the Internet. Bookmarks or favorites permit the user to return to the bookmarked document easily. Existing browser bookmarks (e.g., Internet Explorer's "Favorites") are stored under the current user's settings on a client computer. Local storage of a user's bookmarks at a client, however, has the disadvantage that the user cannot access the bookmarks across multiple different computers. When a user has, for example, a computer at work and at home, the user's bookmarks on one computer cannot be accessed from the other computer. Thus, using existing client-side bookmarks, users typically cannot access the same set of bookmarks across multiple different computers.

SUMMARY

According to one aspect, a method may include receiving bookmarks that identify documents from a user at a first client. The method may further include storing the bookmarks in a data structure associated with a server.

According to another aspect, a method may include importing bookmarks or favorites associated with documents from a browser at a first client. The method may further include storing the imported bookmarks at a remote server.

According to a further aspect, a method may include receiving, at a server, an action request associated with bookmarks from a client, wherein the bookmarks identify user designated documents. The method may further include accessing bookmark records stored at the server based on the action request and acting on the bookmark records in a manner specified by the action request.

According to an additional aspect, a method may include sending multiple bookmarks from a client to a server for storage of the bookmarks at the server. The method may further include providing a toolbar in a browser at the client that permits a user to manage, search and share the multiple bookmarks stored at the server.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Consistent with aspects of the invention, bookmarks may be moved from a client-side to a server-side to enable users to access the same set of bookmarks across different computers. Storage of bookmarks at a server permits users to use different computers at different locations while also being able to access the users' bookmarks from a remote centralized storage associated with the server. When implemented as part of a toolbar (e.g., Google toolbar), users may access the users' bookmarks from any computer and at any location and retrieve, manage, and add new bookmarks to a list of bookmarks maintained by the server for each of the users.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Overview

Figure 1:
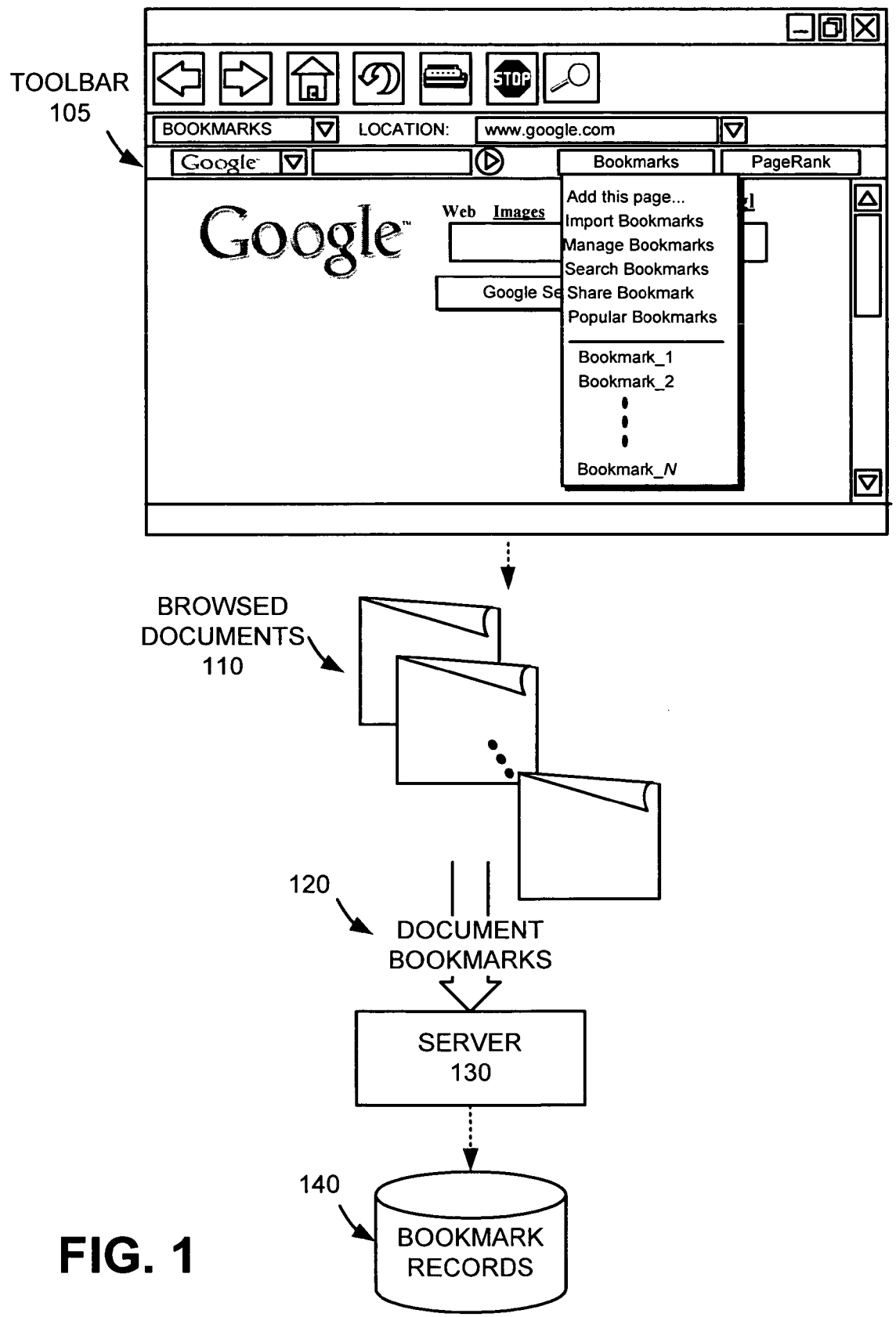
FIG. 1 is an exemplary diagram of an overview of an implementation of the invention.

FIG. 1 illustrates an exemplary overview of an implementation of the invention that stores document bookmarks on a server side for access by users at one or more different clients. A user using a toolbar 105 at a client (not shown) may browse multiple different documents 110 via a browser and, among the browsed documents 110, may select one or more documents to be "bookmarked" for future access and browsing. Each of the document bookmarks 120 may be sent by toolbar 105 to a remote server 130 for storage. Server 130 may store each of the document bookmarks 120 as a bookmark record in a data structure that stores multiple bookmark records 140.

The user may subsequently, either at the client associated with toolbar 105 or at a different toolbar and client (not shown), access the user's bookmarks stored in bookmark records 140 via server 130. The user, thus, is not limited to using a single client to enable access and use of a same set of bookmarks, but may access and use bookmarks from multiple different computers.

Exemplary Network Configuration

Figure 2:
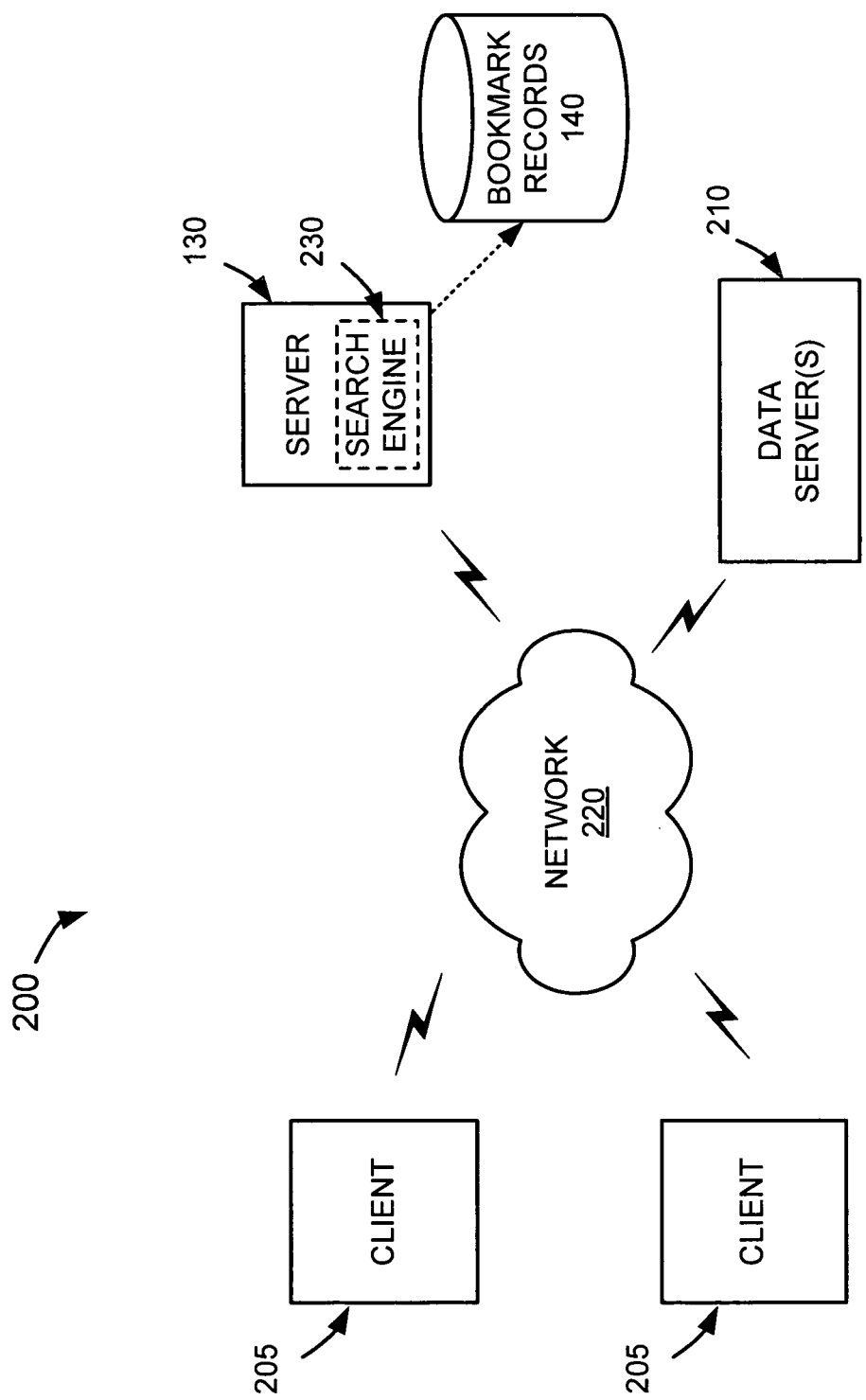
FIG. 2 is an exemplary diagram of a network in which systems and methods consistent with principles of the invention may be implemented.

FIG. 2 is an exemplary diagram of a network 200 in which systems and methods consistent with the principles of the invention may be implemented. Network 200 may include multiple clients 205 connected to one or more servers 130 or 210 via a network 220. Two clients 205 and two servers 130 and 210 have been illustrated as connected to network 220 for simplicity. In practice, there may be more or fewer clients and servers. Also, in some instances, a client may perform one or more functions of a server and a server may perform one or more functions of a client.

Clients 205 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Clients 205 may implement a browser for browsing documents stored at servers 130 or 210, the browser including a toolbar 105 that includes server bookmark functionality, as further described in detail below. Servers 130 and 210 may include server entities that access, fetch, aggregate, process, search, and/or maintain documents in a manner consistent with the principles of the invention. Clients 205 and servers 130 and 210 may connect to network 220 via wired, wireless, and/or optical connections.

In an implementation consistent with the principles of the invention, server 130 may include a search engine 230 usable by users at clients 205. Server 130 may implement a data aggregation service by crawling a corpus of documents (e.g., web pages) hosted on data server(s) 210, indexing the documents, and storing information associated with these documents in a repository of crawled documents. The aggregation service may be implemented in other ways, such as by agreement with the operator(s) of data server(s) 210 to distribute their documents via the data aggregation service. Search engine 230 may execute a search using a query, received from a user at a client 205, on the corpus of documents stored in the repository of crawled documents. Server 130 may provide, to a user issuing a query, a ranked list of documents related to the issued query. Server 130 may also store bookmarks, received from respective users at clients 205, in bookmarks records 140. The stored bookmarks may subsequently be retrieved by respective users at clients 205 via server 130.

Data server(s) 210 may store or maintain documents that may be crawled by server 130. Such documents may include data related to published news stories, products, images, user groups, geographic areas, or any other type of data. For example, server(s) 210 may store or maintain news stories from any type of news source, such as, for example, the Washington Post, the New York Times, Time magazine, or Newsweek. As another example, server(s) 210 may store or maintain data related to specific products, such as product data provided by one or more product manufacturers. As yet another example, server(s) 210 may store or maintain data related to other types of web documents, such as pages of web sites.

While servers 130 and 210 are shown as separate entities, it may be possible for one of servers 130 or 210 to perform one or more of the functions of the other one of servers 130 or 210. For example, it may be possible that servers 130 and 210 are implemented as a single server. It may also be possible for a single one of servers 130 and 210 to be implemented as two or more separate (and possibly distributed) devices.

Network 220 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

Exemplary Client/Server Architecture

Figure 3:
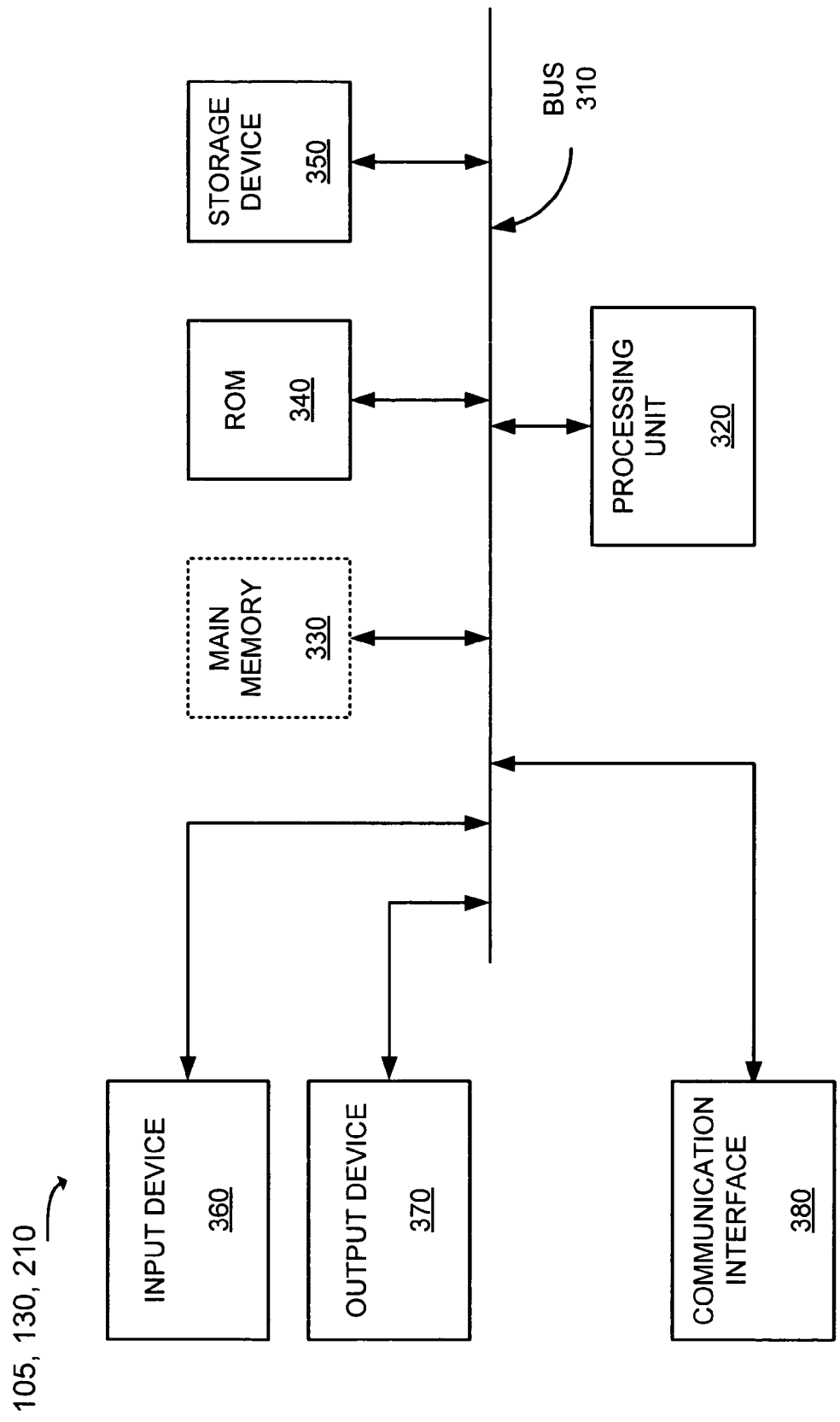
FIG. 3 is an exemplary diagram of a client or server of FIG. 2 according to an implementation consistent with principles of the invention.

FIG. 3 is an exemplary diagram of a client or server entity (hereinafter called "client/server entity"), which may correspond to one or more of clients 205 and/or servers 130 or 210, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Client Toolbar

Figure 4:
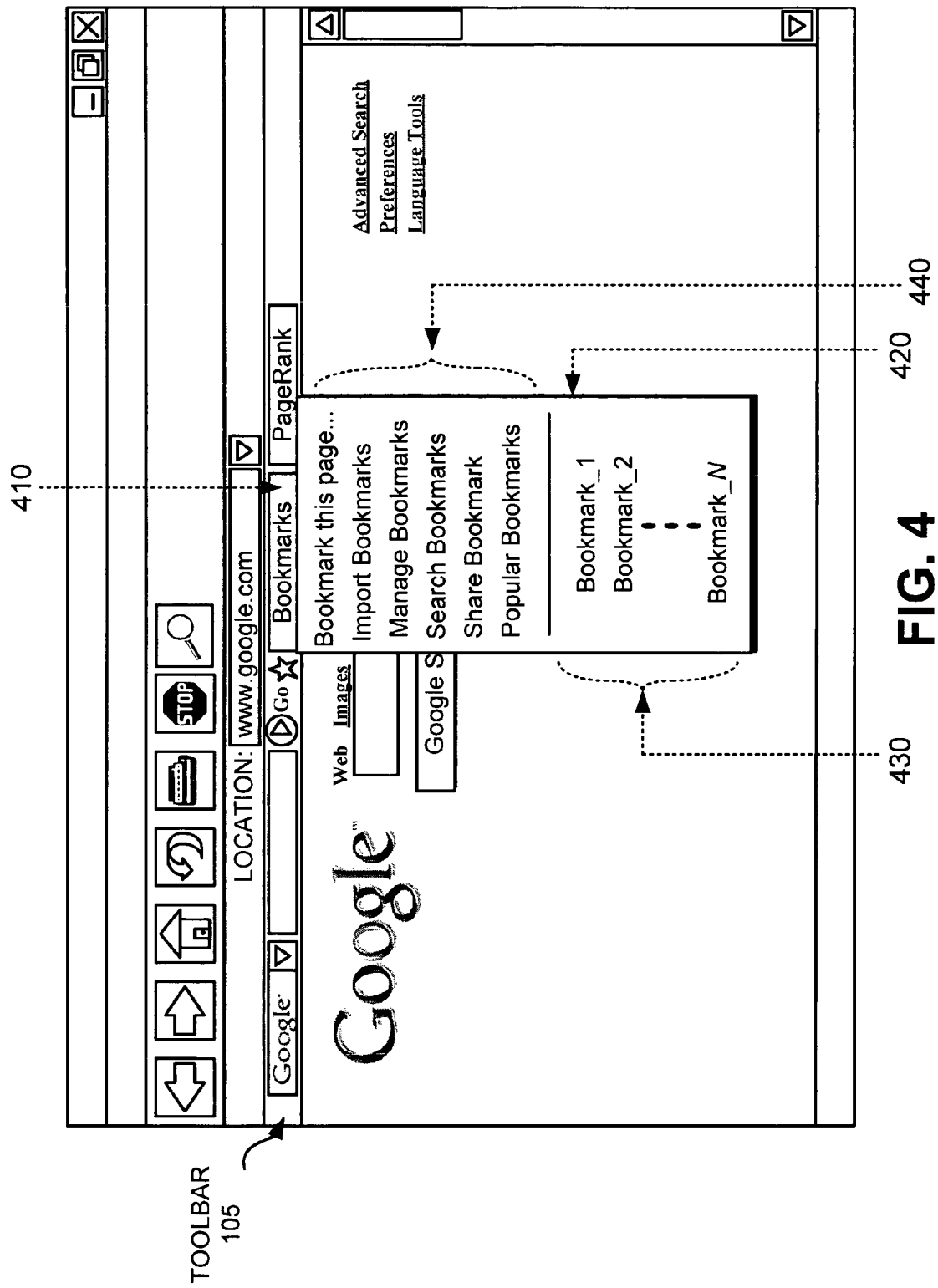
FIG. 4 is a diagram of an exemplary toolbar that includes bookmarks that may be stored at a remote server consistent with principles of the invention.

FIG. 4 is a diagram that depicts an exemplary browser toolbar 105 at a client 205. Among other features, toolbar 105 may include a "bookmark" button 410, the selection of which by a user at client 205 may produce a bookmark window 420. Bookmark window 420 may include a list of multiple bookmarks 430 associated with the user, and multiple bookmark actions 440 that may be selected by the user. As shown, bookmark actions 440 may include "add this page . . . " which adds a current web page browsed by a user to the list of bookmarks 430 and/or to the user's bookmark records stored at server 130. Bookmark actions 440 may further include "import bookmarks," the selection of which imports bookmarks stored in association with a browser at client 205 into the user's bookmark records stored at server 130. Bookmark actions 440 may also include "manage bookmarks," the selection of which permits the user to manage the user's server bookmarks in various ways. Bookmark actions 440 may further include "search bookmarks," the selection of which permits the user to search through the user's bookmarks stored at server 130 using a user specified search query. Bookmark actions 440 may also include "share bookmark," the selection of which permits the user to share one or more of the user's bookmarks with other users via server 130. Bookmark actions 440 may further include "popular bookmarks," the selection of which permits the user to access bookmarks identified by server 130 as being popular among multiple different users.

Figure 5:
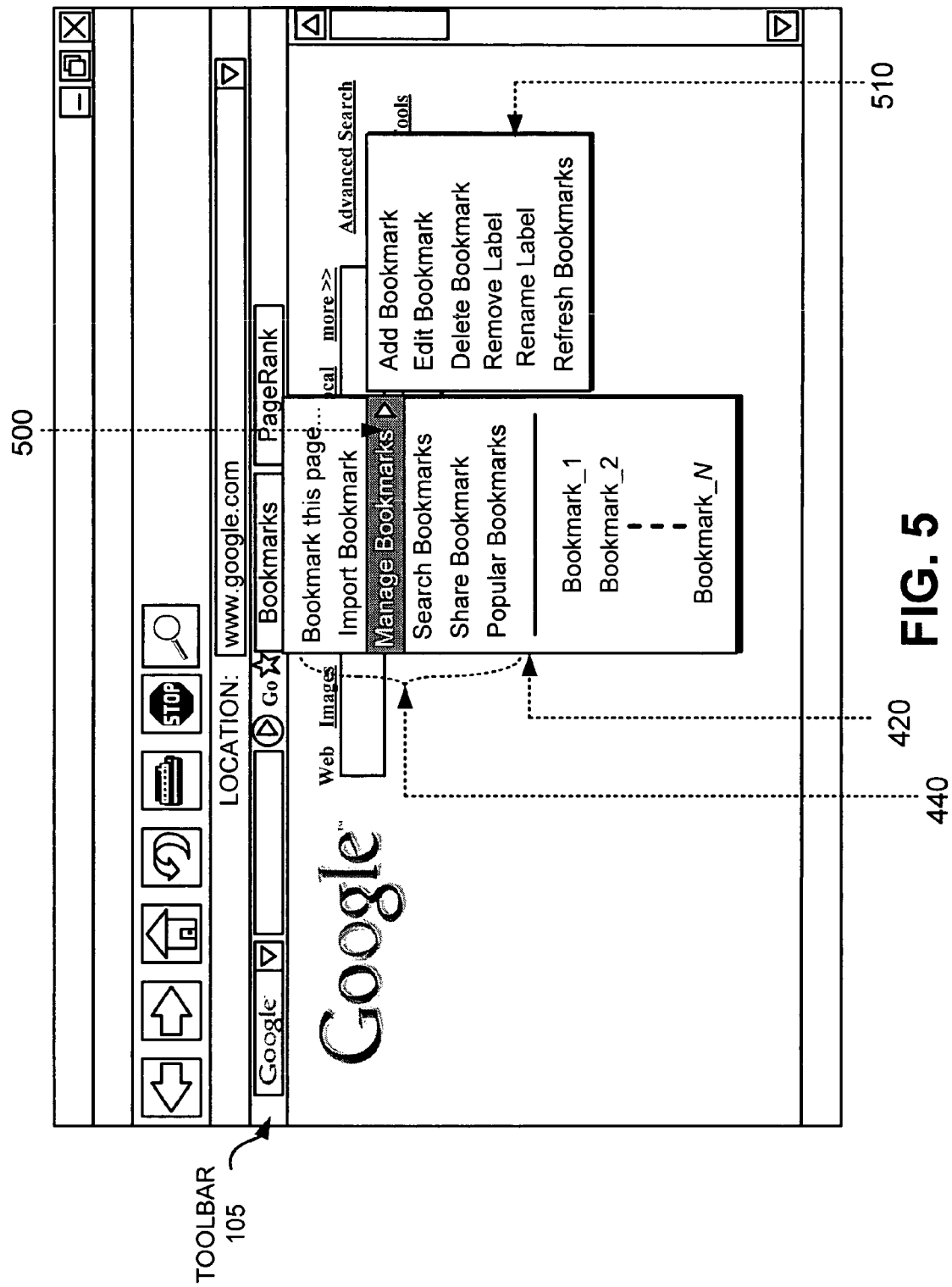
FIG. 5 is a diagram that depicts an exemplary bookmark management window on the toolbar of FIG. 5 consistent with principles of the invention.
Figure 6A:
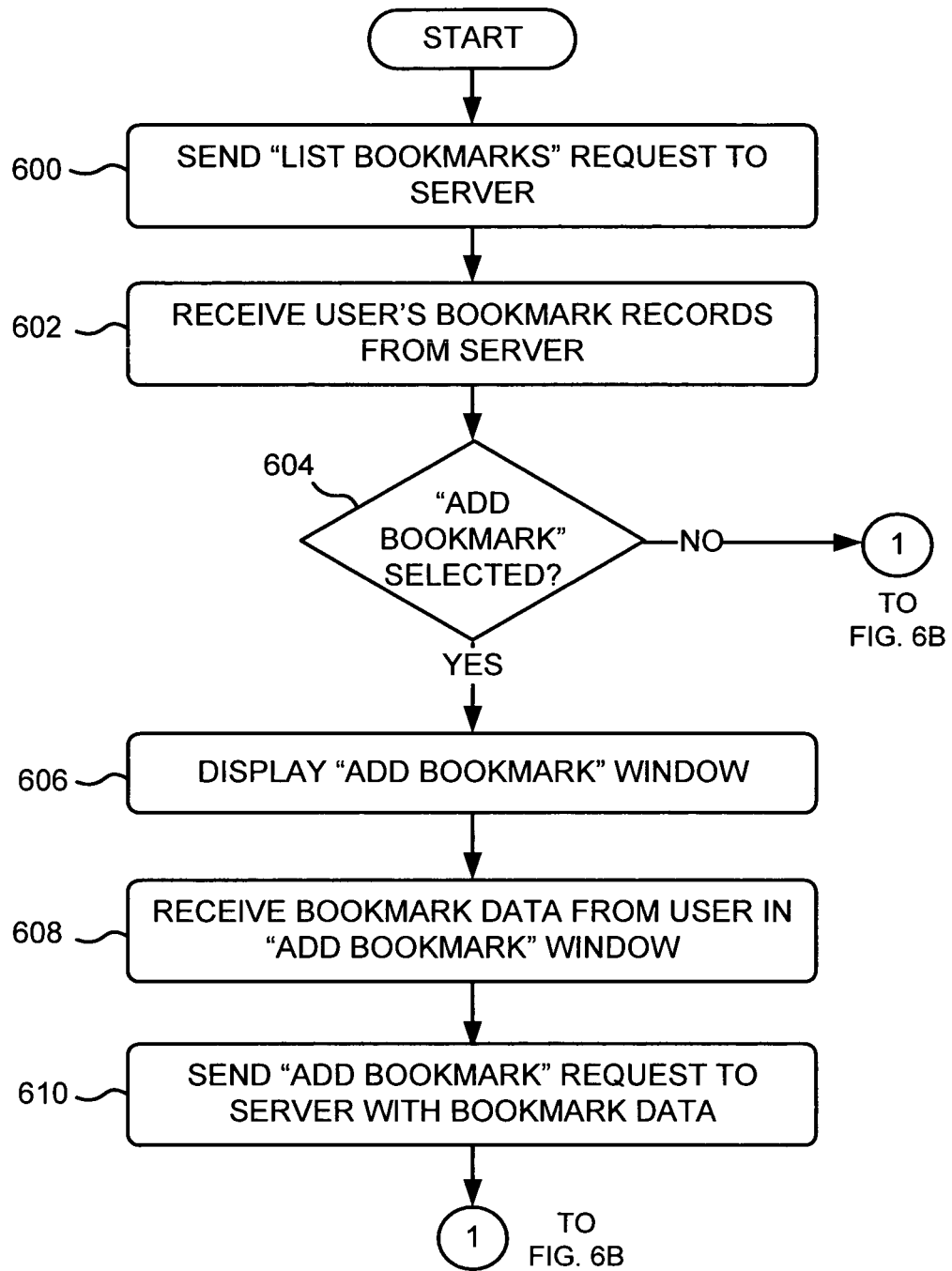
FIGS. 6A through 6G are a flowchart of an exemplary process for accessing and managing server bookmarks using a toolbar at a client consistent with principles of the invention.
Figure 6B:
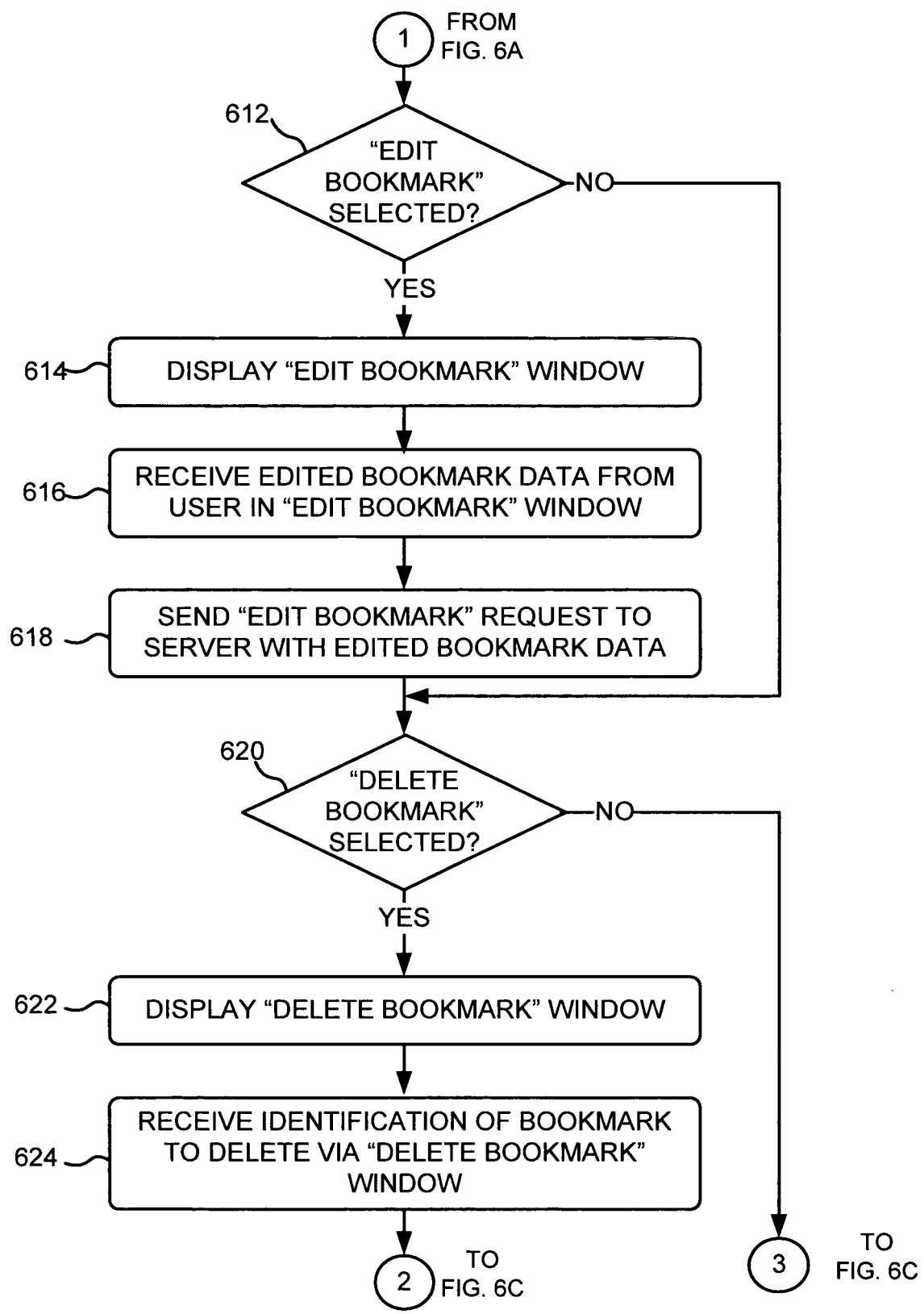
Figure 6C:
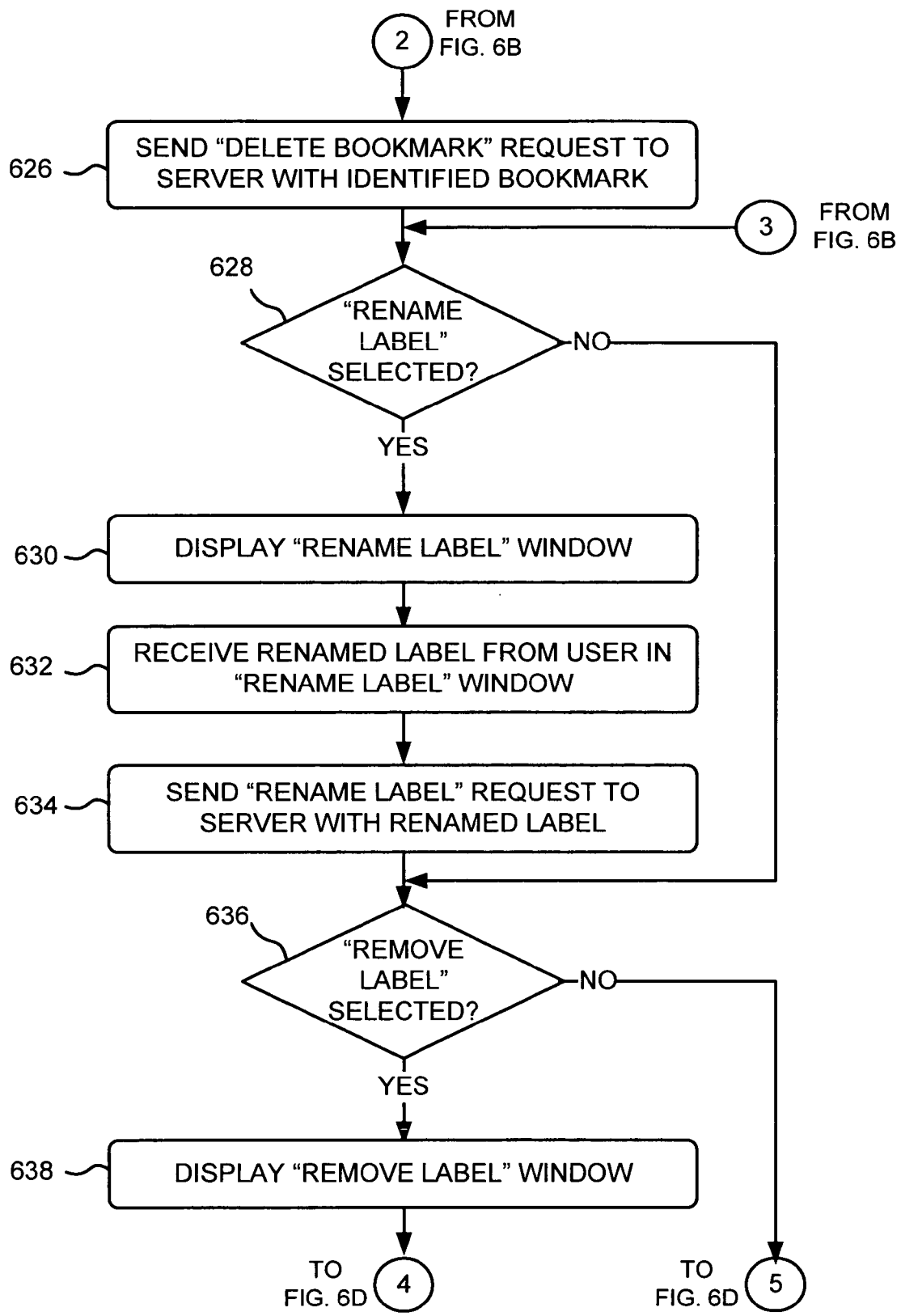
Figure 6D:
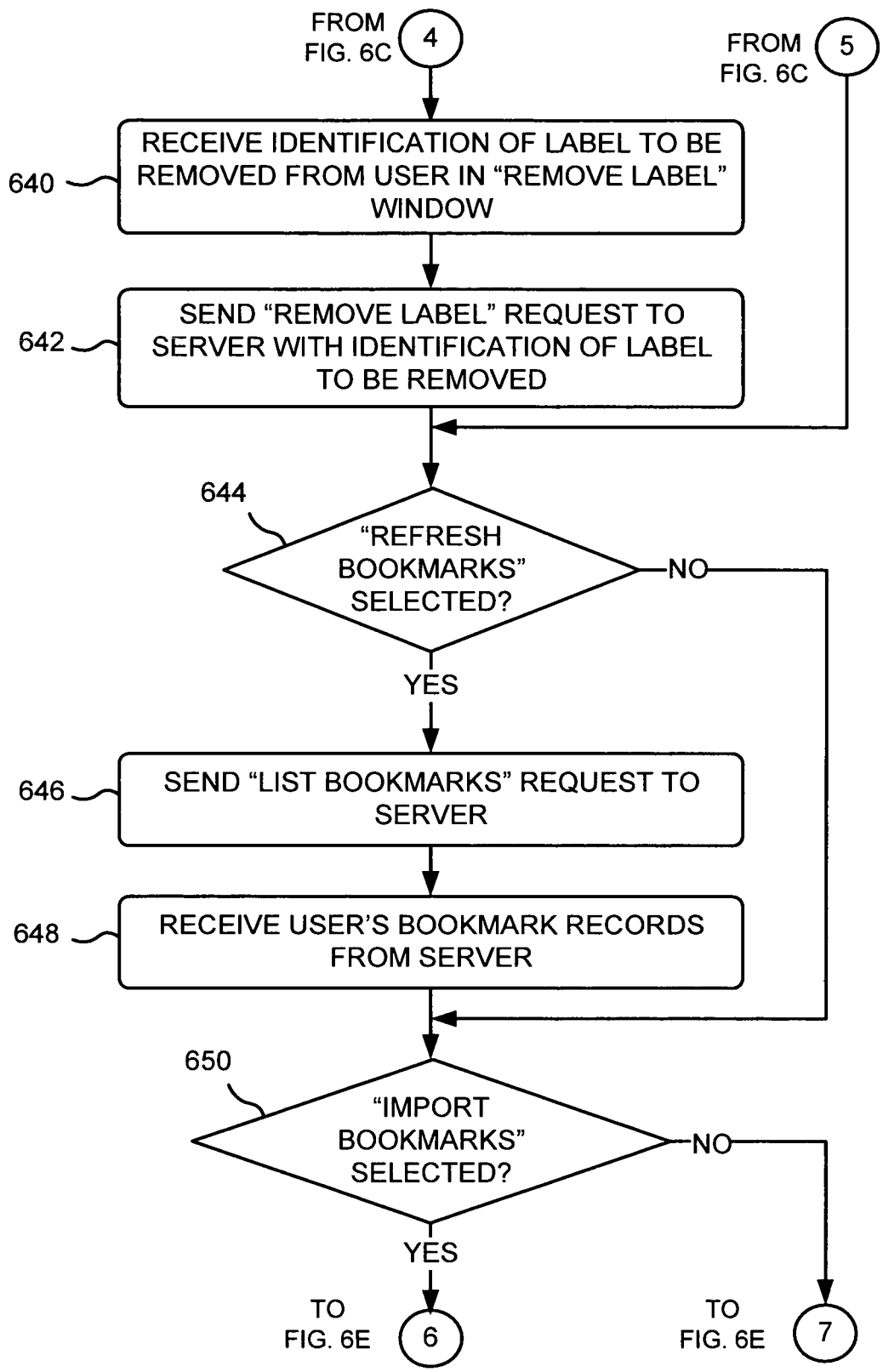
Figure 6E:
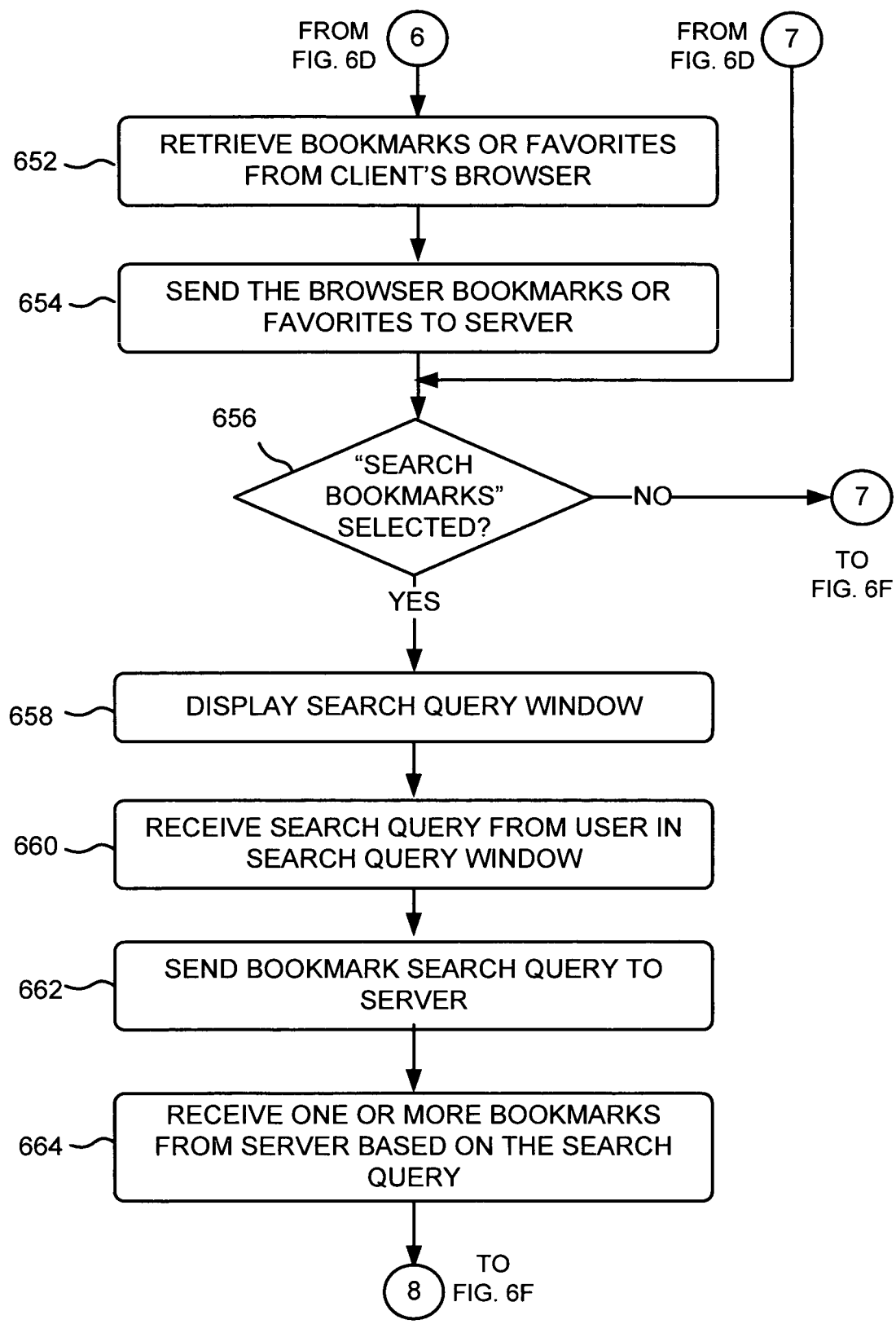
Figure 6F:
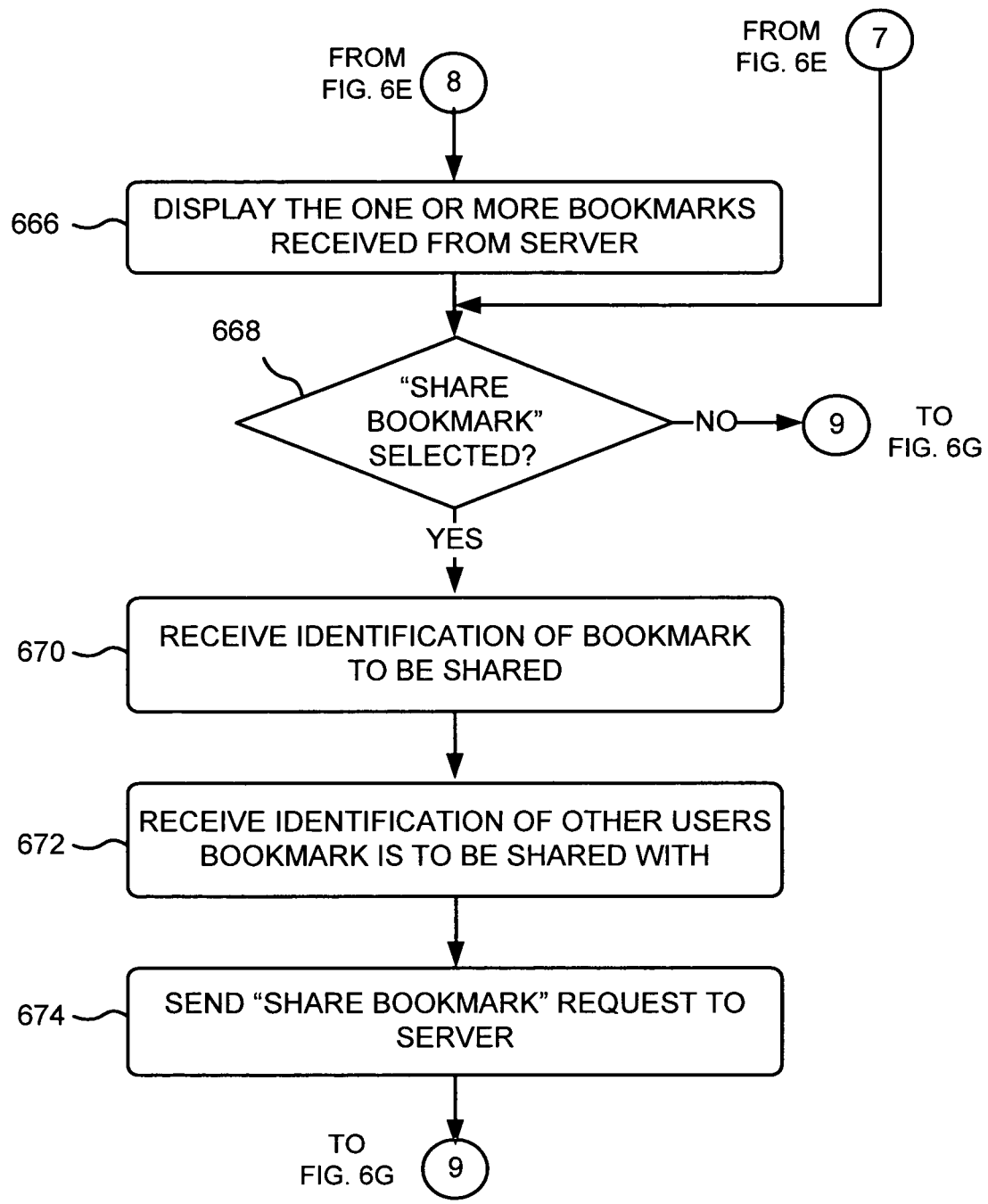
Figure 6G:
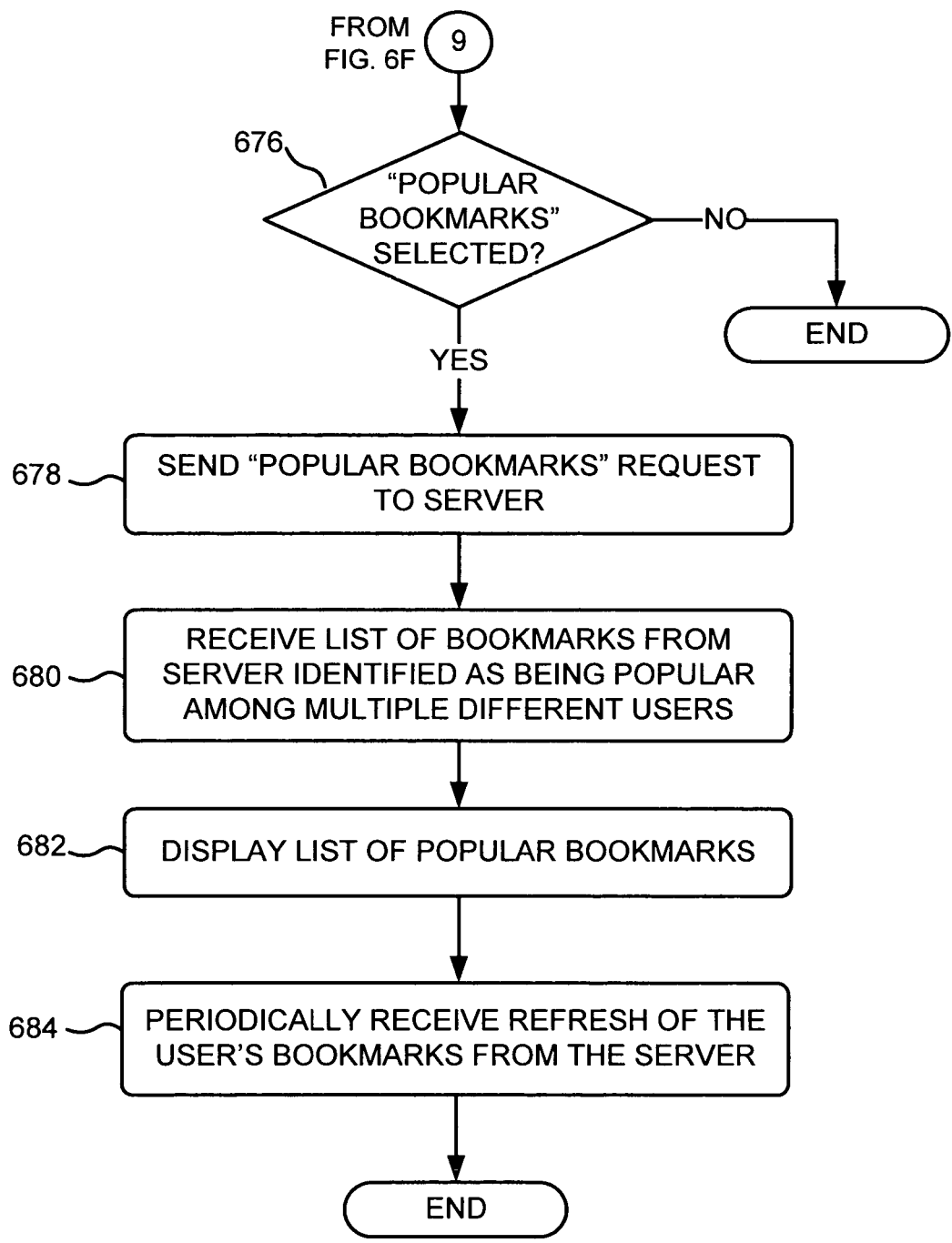

FIG. 5 is a diagram illustrating exemplary "manage bookmarks" actions 500, displayed in a window 510, that may be selected by a user from window 420 of toolbar 105 at client 205. The "manage bookmarks" actions 500 may include, for example, "add bookmark," "edit bookmark," "delete bookmark," "remove label," "rename label" and "refresh bookmarks" actions. A user at client 205 may select each of these bookmark management actions from window 510 (e.g., by clicking-on it using a mouse). Each of these bookmark management actions is further described below with respect to FIG. 6A-6G.

Exemplary Client Toolbar Bookmark Process

FIGS. 6A-6G are a flowchart of an exemplary process for accessing and managing server bookmarks using a toolbar at a client consistent with principles of the invention. The process exemplified by FIGS. 6A-6G may be performed by toolbar 105 at a client 205.

Figure 7:
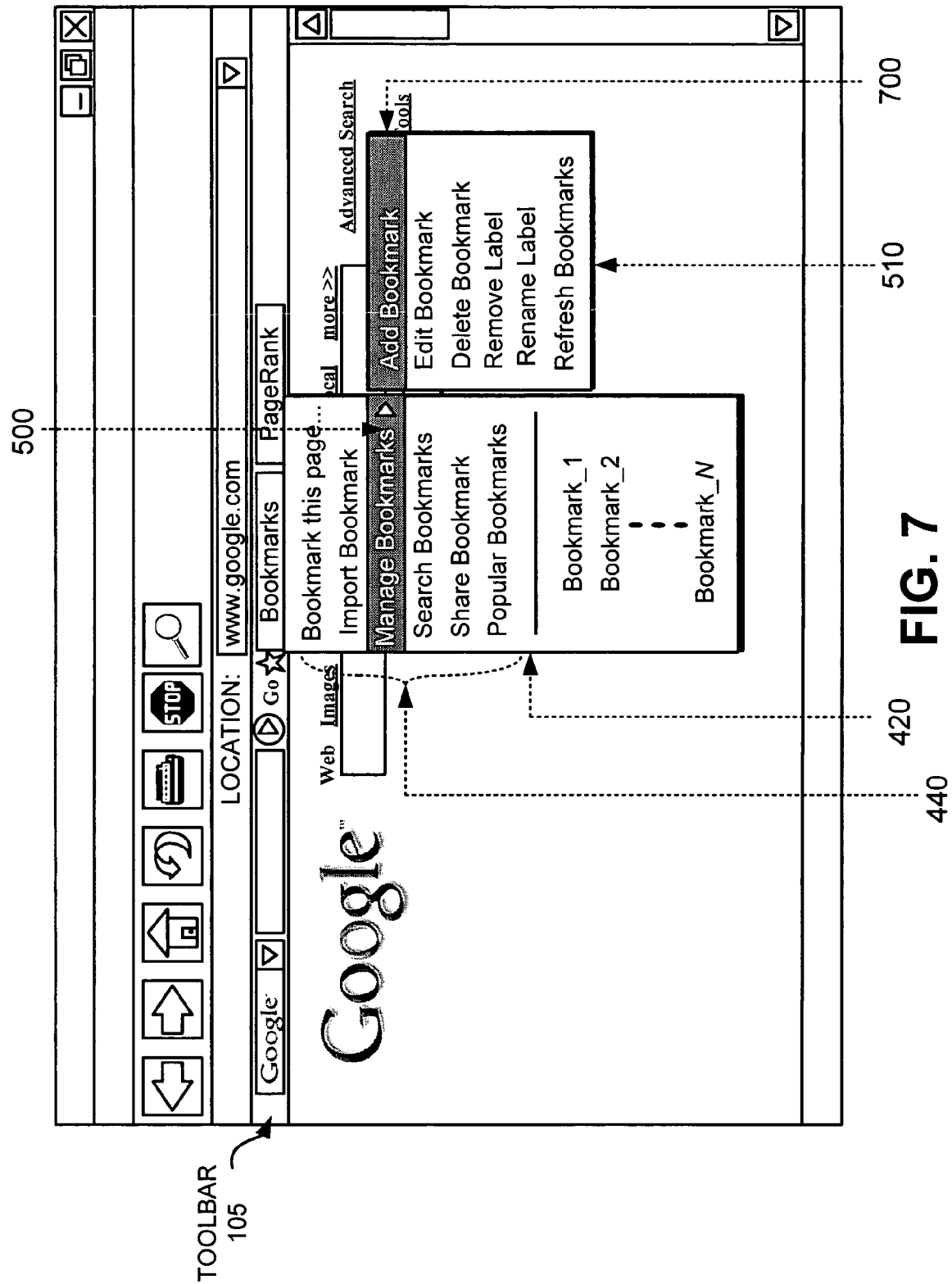
FIGS. 7-23 are diagrams illustrating exemplary toolbar windows associated with user interaction with the client toolbar as described with respect to FIGS. 6A through 6G consistent with principles of the invention.
Figure 8:
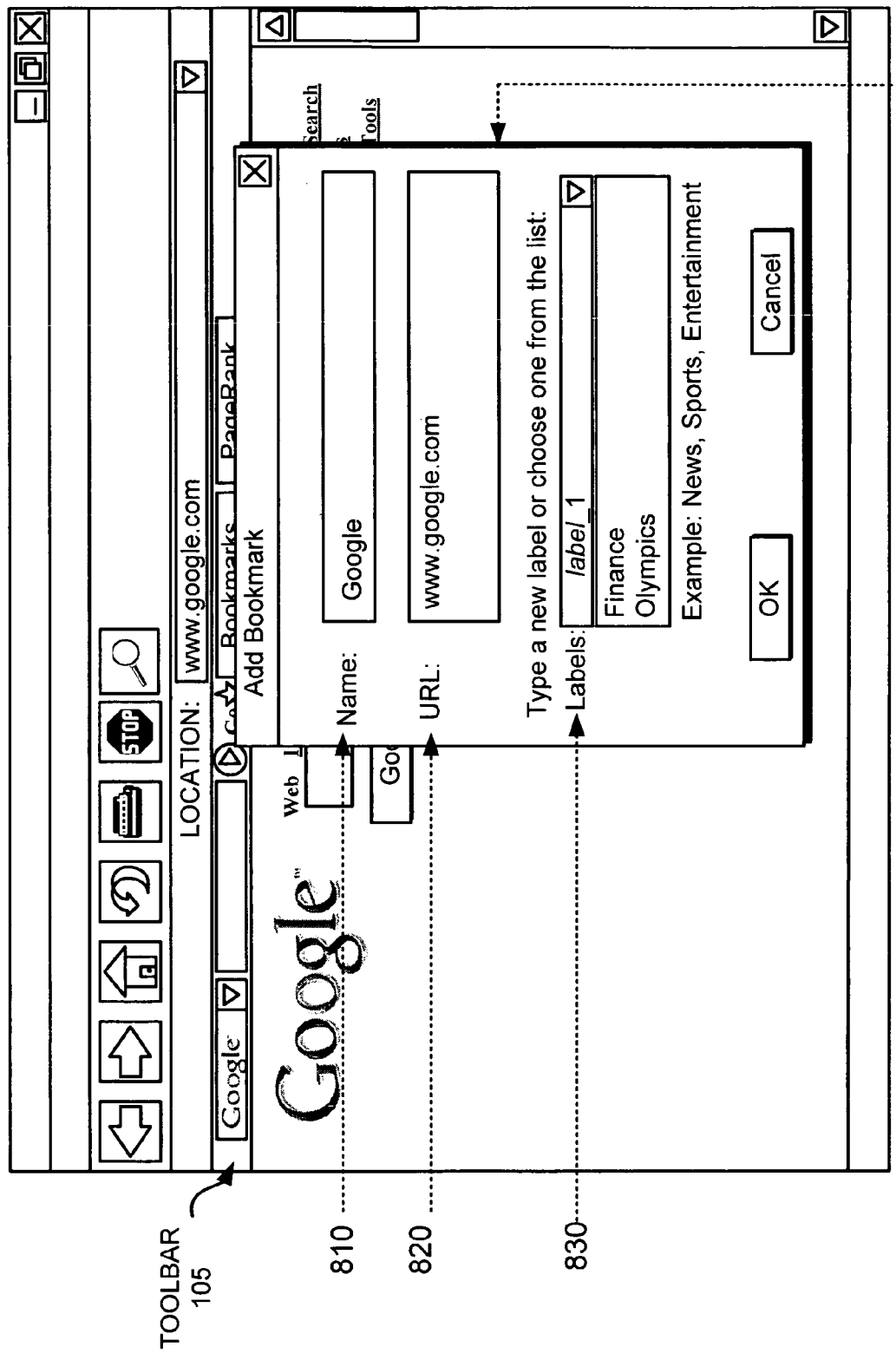

The exemplary process may begin with toolbar 105 sending a "list bookmarks" request to server 130 requesting a user's bookmark records (block 600). In response to the request, toolbar 105 may receive the user's bookmark records back from the server (block 602). Toolbar 105 may determine whether the user has selected "add bookmark" from window 420 of toolbar 105 (block 604). If not, the exemplary process may continue at block 612 below. For example, as shown in FIG. 7, the user may select "add bookmark" 700 from "manage bookmarks" window 510. If the user has selected "add bookmark" from window 420 of toolbar 105, then an "add bookmark" window may be displayed to the user (block 606). FIG. 8 illustrates an exemplary "add bookmark" window 800 that toolbar 105 may display to the user. "Add bookmark" window 800 may include a bookmark name field 810, an address (e.g., URL) field 820 and a labels field 830. Labels entered into labels field 830 may annotate an associated bookmark and may be used to identify or categorize, the associated bookmark. Each bookmark may have one or more unique labels, or may share one or more labels with other bookmarks. Labels assigned to bookmarks may be used for organizing the bookmarks. The user may enter new labels into labels field 830, or may select one or more labels from a list of the user's existing labels. In one implementation, labels field 830 may include an "auto-complete" function that, after the user entry of a few letters of a label, automatically supplies one or more existing labels that match the entered letters.

Bookmark data from the user may then be received via the "add bookmark" window (block 608). As shown in FIG. 8, to add a bookmark, the user may enter appropriate data into each of the fields 810, 820 and/or 830, and then select "OK." Toolbar 105 may send an "add bookmark" request to server 130 with the bookmark data received from the user (block 610). As described below with respect to FIGS. 24A-24E, server 130 may store the new bookmark in bookmark records 140 for subsequent access and retrieval by the user.

Figure 9:
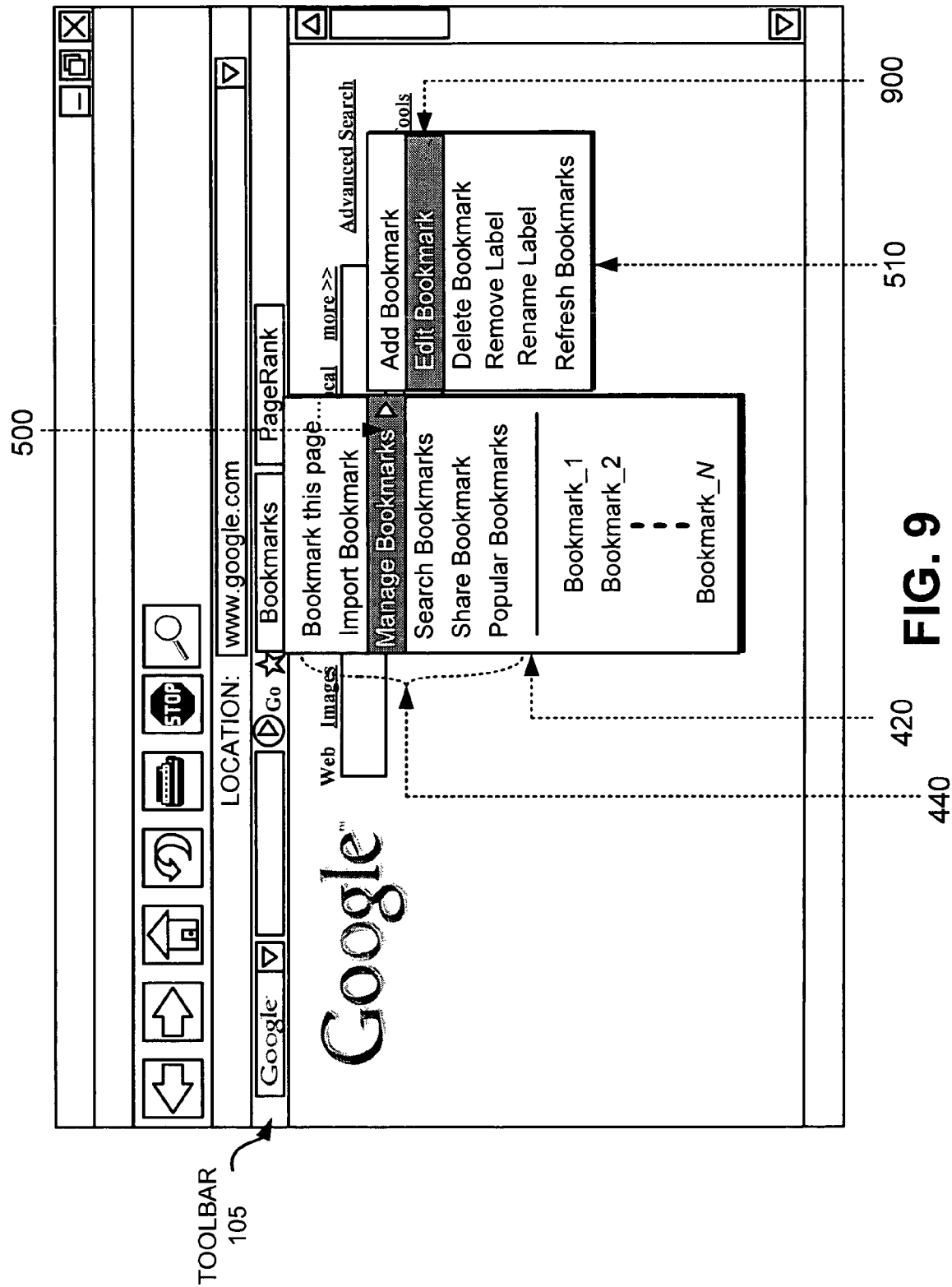
Figure 10:
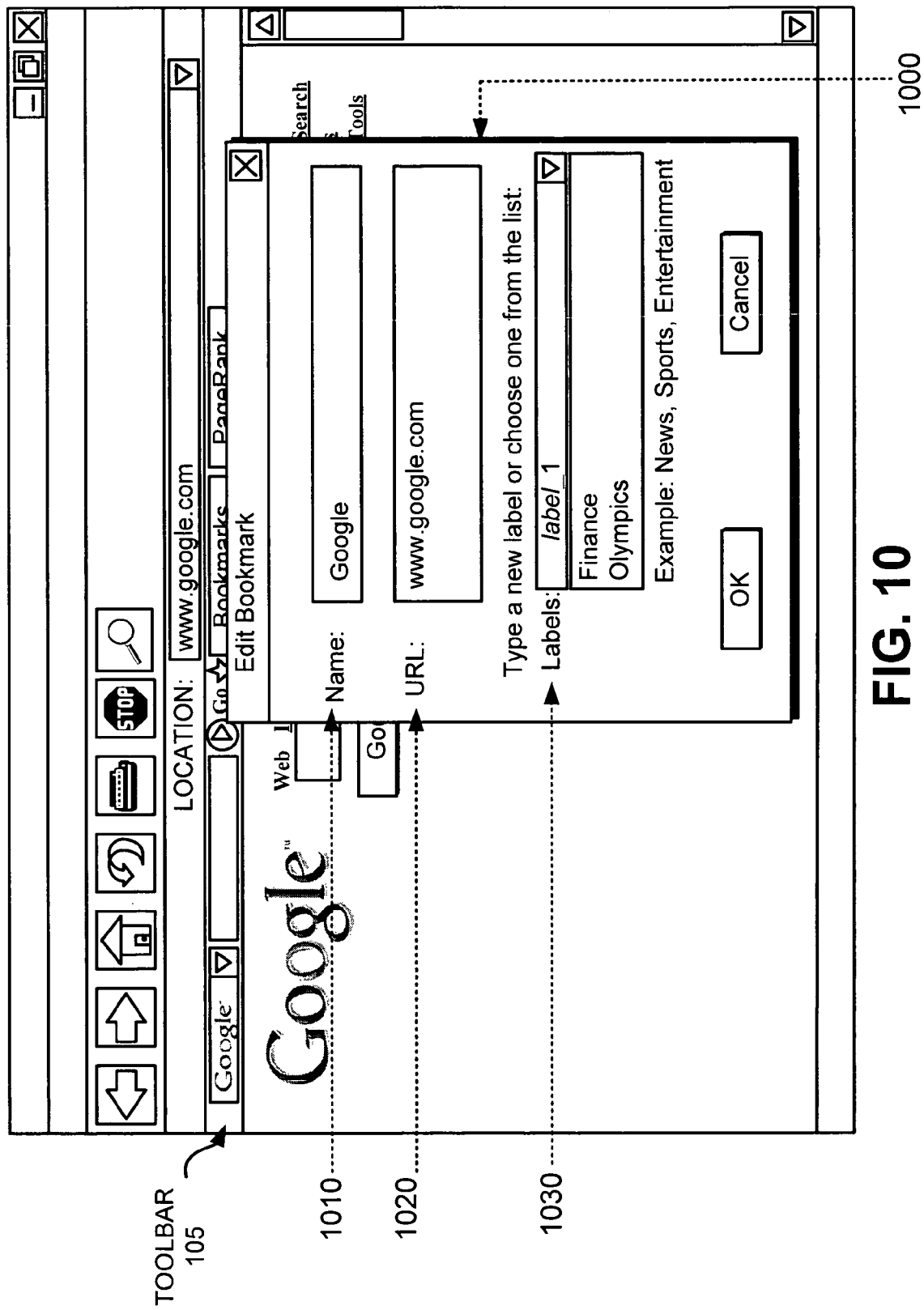

Toolbar 105 may determine whether "edit bookmark" has been selected from window 420 of toolbar 105 (block 612). If not, the exemplary process may continue at block 620 below. For example, as shown in FIG. 9, the user may select "edit bookmark" 900 from the "manage bookmarks" window 510. If the user has selected "edit bookmark" from window 420, then toolbar 105 may display an "edit bookmark" window to the user (block 614). FIG. 10 illustrates an exemplary "edit bookmark" window 1000 that toolbar 105 may display to the user. "Edit bookmark" window 1000 may include a bookmark name field 1010, an address (e.g., URL) field 1020 and a labels field 1030. Toolbar 105 may receive edited bookmark data from the user via the "edit bookmark" window (block 616). As shown in FIG. 10, the user may edit the current data contained in each field 1010, 1020 or 1030 for a selected bookmark. Toolbar 105 may then send an "edit bookmark" request to server 130 with the edited bookmark data (block 618). As described below with respect to FIGS. 24A-24E, server 130 may stored the edit bookmark in bookmark records 140 for subsequent access and retrieval by the user.

Figure 11:
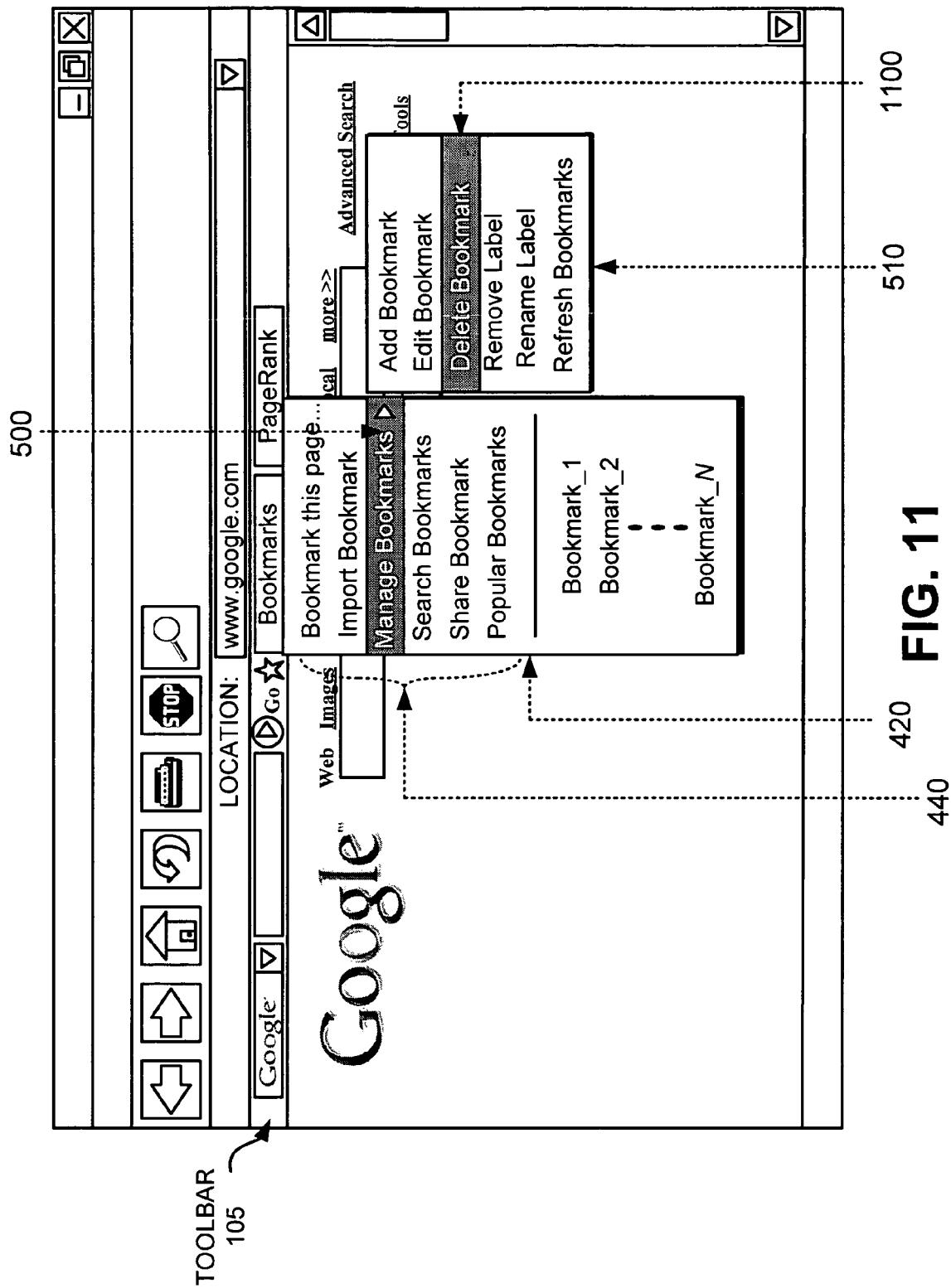
Figure 12:
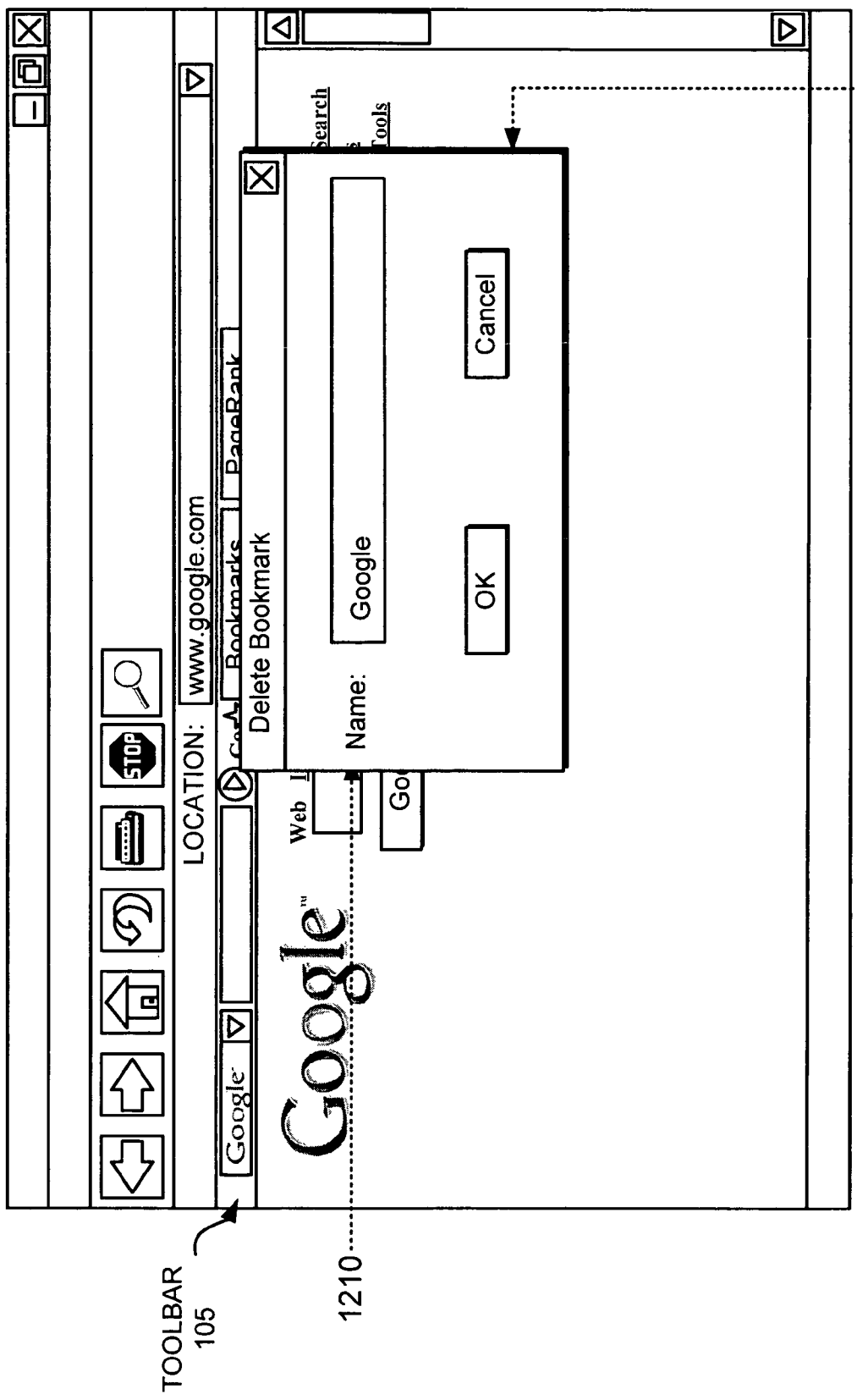

Toolbar 105 may determine whether "delete bookmark" has been selected from window 420 of toolbar 105 (block 620). If not, the exemplary process may continue at block 628 below. For example, as shown in FIG. 11, the user may select "delete bookmark" 1100 from the "manage bookmarks" window 510. If the user has selected "delete bookmark" from window 420, then toolbar 105 may display a "delete bookmark" window (block 622). FIG. 12 illustrates an exemplary "delete bookmark" window 1200 that toolbar 105 may display to the user. "Delete bookmark" window 1200 may include a name field 1210 that permits the user to enter the name of the bookmark that the user wishes to have deleted from bookmark records 140. Toolbar 105 may receive an identification of the bookmark to delete via the "delete bookmark" window (block 624). As shown in FIG. 12, the user may enter the name of the bookmark that the user wishes to delete in name field 1210 of window 1200. Toolbar 105 may send a "delete bookmark" request to server 130 along with the identification of the bookmark to be deleted (block 626). As described below with respect to FIGS. 24A-24E, server 130 may delete the corresponding bookmark from bookmark records 140.

Figure 13:
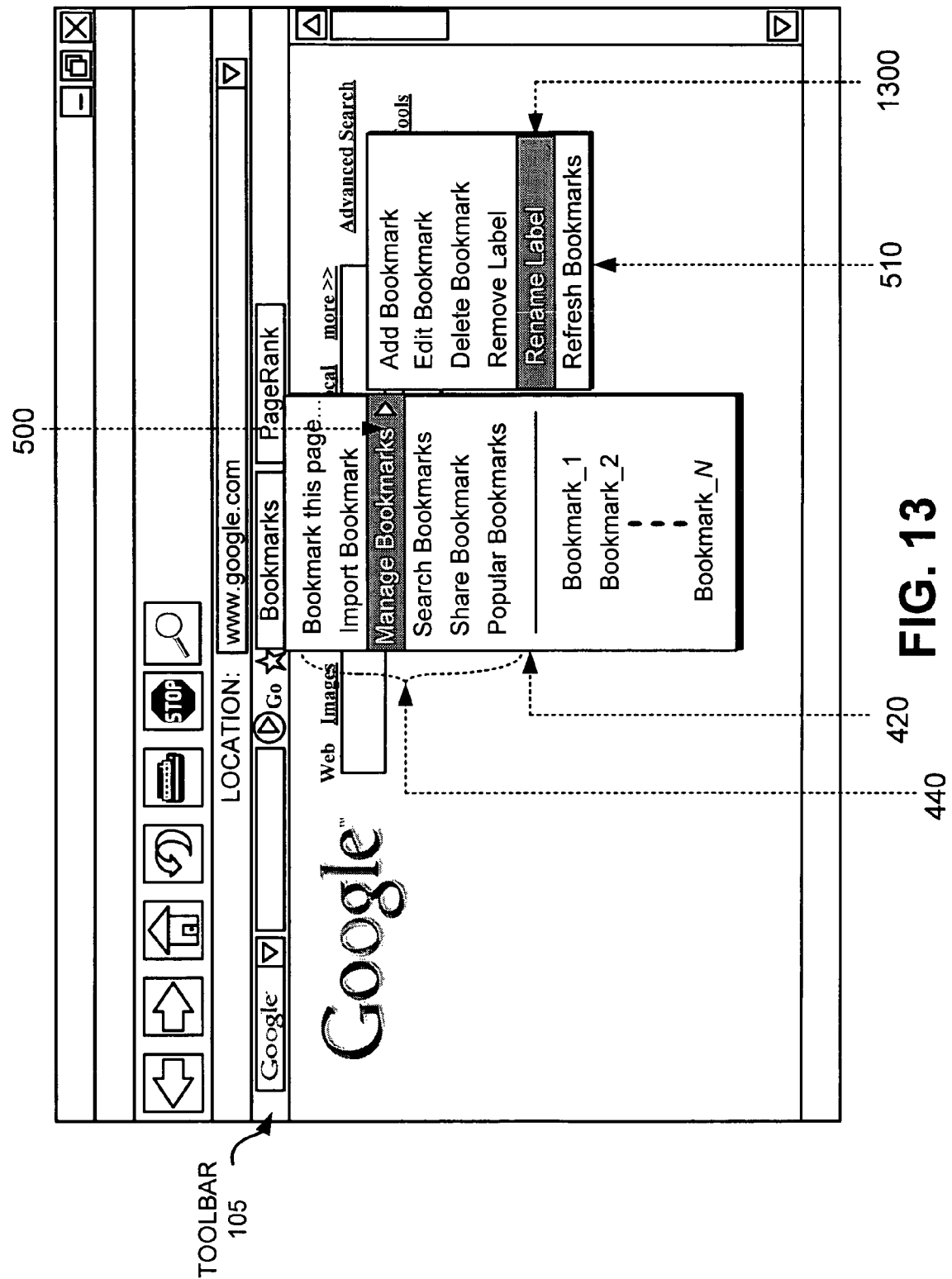

Toolbar 105 may determine whether "rename label" has been selected from window 420 of toolbar 105 (block 628). If not, the exemplary process may continue at block 636 below. For example, as shown in FIG. 13, the user may select "rename label" 1300 from the "manage bookmarks" window

Figure 14:
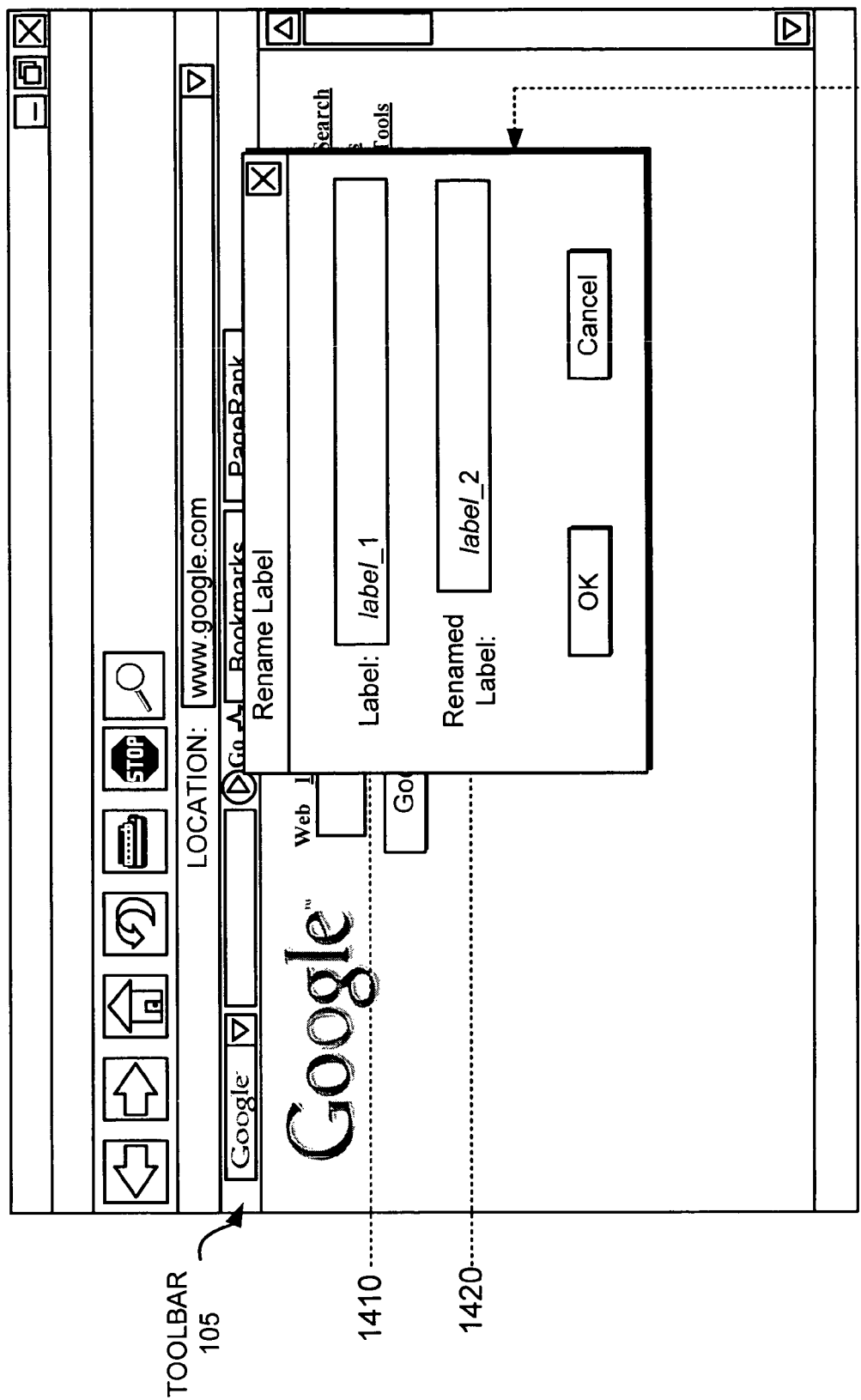

510. If "rename label" has been selected from window 510, then toolbar 105 may display a "rename label" window (block 630). FIG. 14 illustrates an exemplary "rename label" window 1400 that toolbar 105 may display to the user. "Rename label" window 1400 may include a first label field 1410 that includes an identification of a current label, and a second label field 1420 that includes an identification of a new label that the user wishes to replace the current label with. Toolbar 105 may receive the renamed label from the user via the "rename label" window (block 632). As shown in FIG. 14, the user may enter the current label in field 1410, and the new label in field 1420. Toolbar 105 may send a "rename label" request to server 130 with the renamed label (block 634). As described below with respect to FIGS. 24A-24E, server 130 may rename the label in bookmarks records 140 in response to the "rename label" request.

Figure 15:
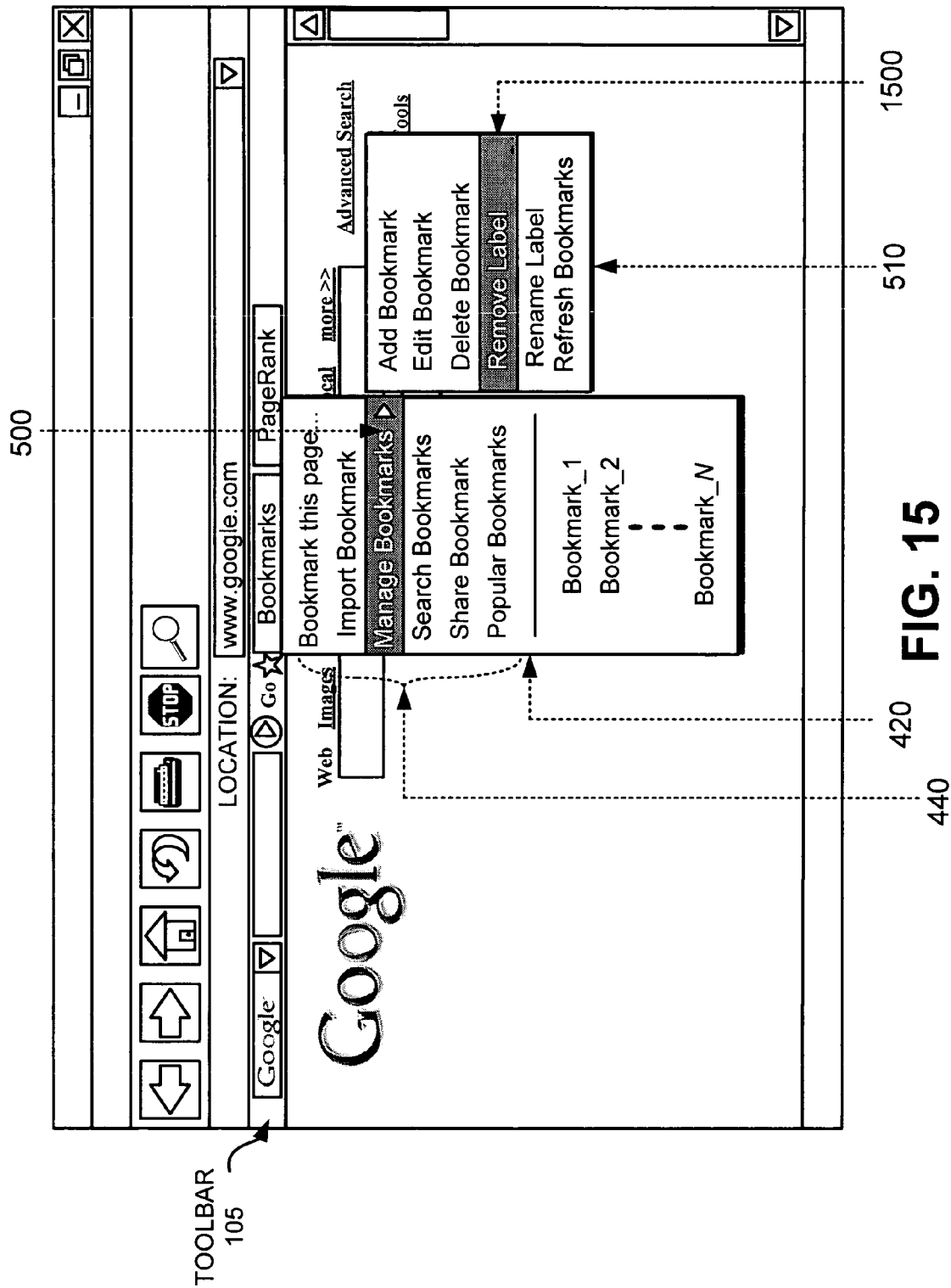
Figure 16:
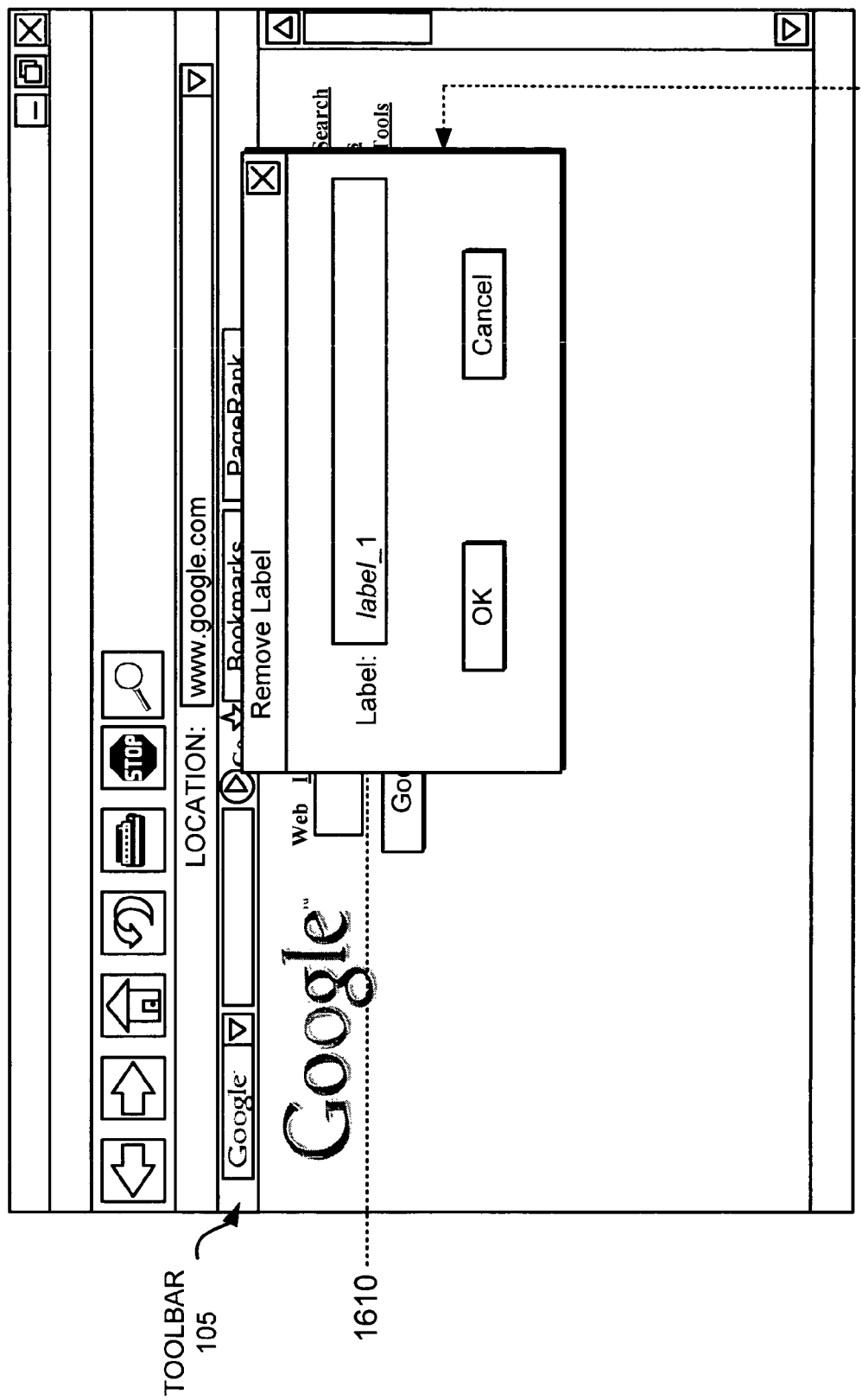

Toolbar 105 may determine whether "remove label" has been selected from window 420 of toolbar 105 (block 636). If not, the exemplary process may continue at block 644 below. For example, as shown in FIG. 15, the user may select "remove label" 1500 from the "manage bookmarks" window 510. If "remove label" has been selected from window 420, then toolbar 105 may display a "remove window" to the user (block 638). FIG. 16 illustrates an exemplary "remove label" window 1600 that toolbar 105 may display to the user. "Remove label" window 1600 may include a label field 1610 that includes an identification of current label to be removed from the user's bookmark records. Toolbar 105 may receive an identification of the label to be removed from the user via the "remove window" (block 640). For example, as shown in FIG. 16, the user may enter the label to be removed in label field 1610 and then select "OK" in window 1600. Toolbar 105 may send a "remove label" request to server 130 with an identification of the label to be removed from the user's bookmark records (block 642). As described below, server 130 may remove the requested label from the user's bookmark records.

Figure 17:
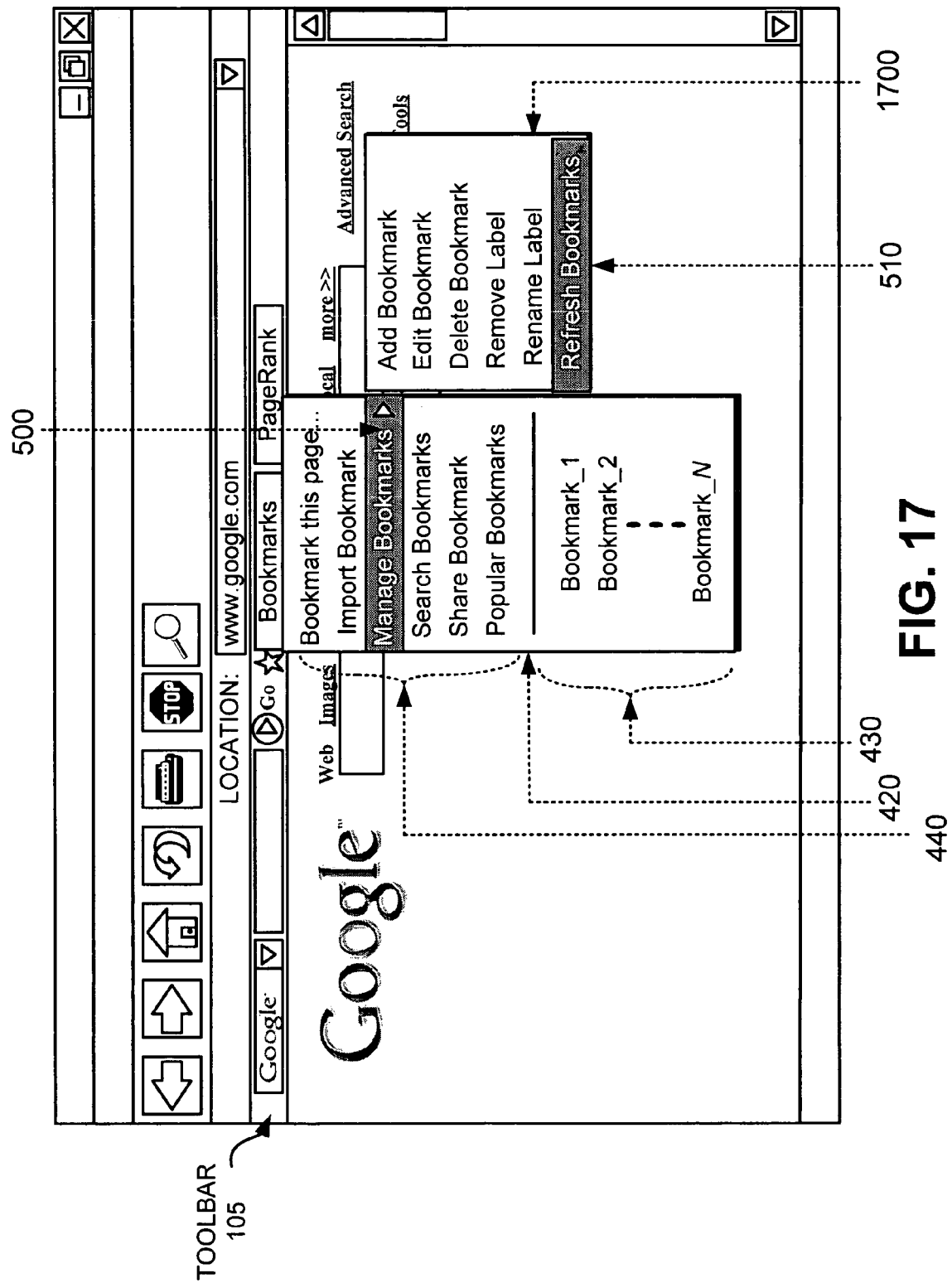

Toolbar 105 may determine whether "refresh bookmarks" has been selected from window 420 of toolbar 105 (block 644). If not, the exemplary process may continue at block 650 below. For example, as shown in FIG. 17, the user may select "refresh bookmarks" 1700 from the "manage bookmarks" window 510. If "refresh bookmarks" has been selected from window 420, toolbar 105 may send a "list bookmarks" request to server 130, requesting that server 130 return a list of the user's current bookmarks stored in the bookmark records (block 646). Toolbar 105 may receive the user's bookmarks from server 130, in response to the request, and may display them to the user (block 648). For example, as shown in FIG. 17, the refreshed bookmarks may be displayed in the list of bookmarks 430 contained in window 420.

Figure 18:
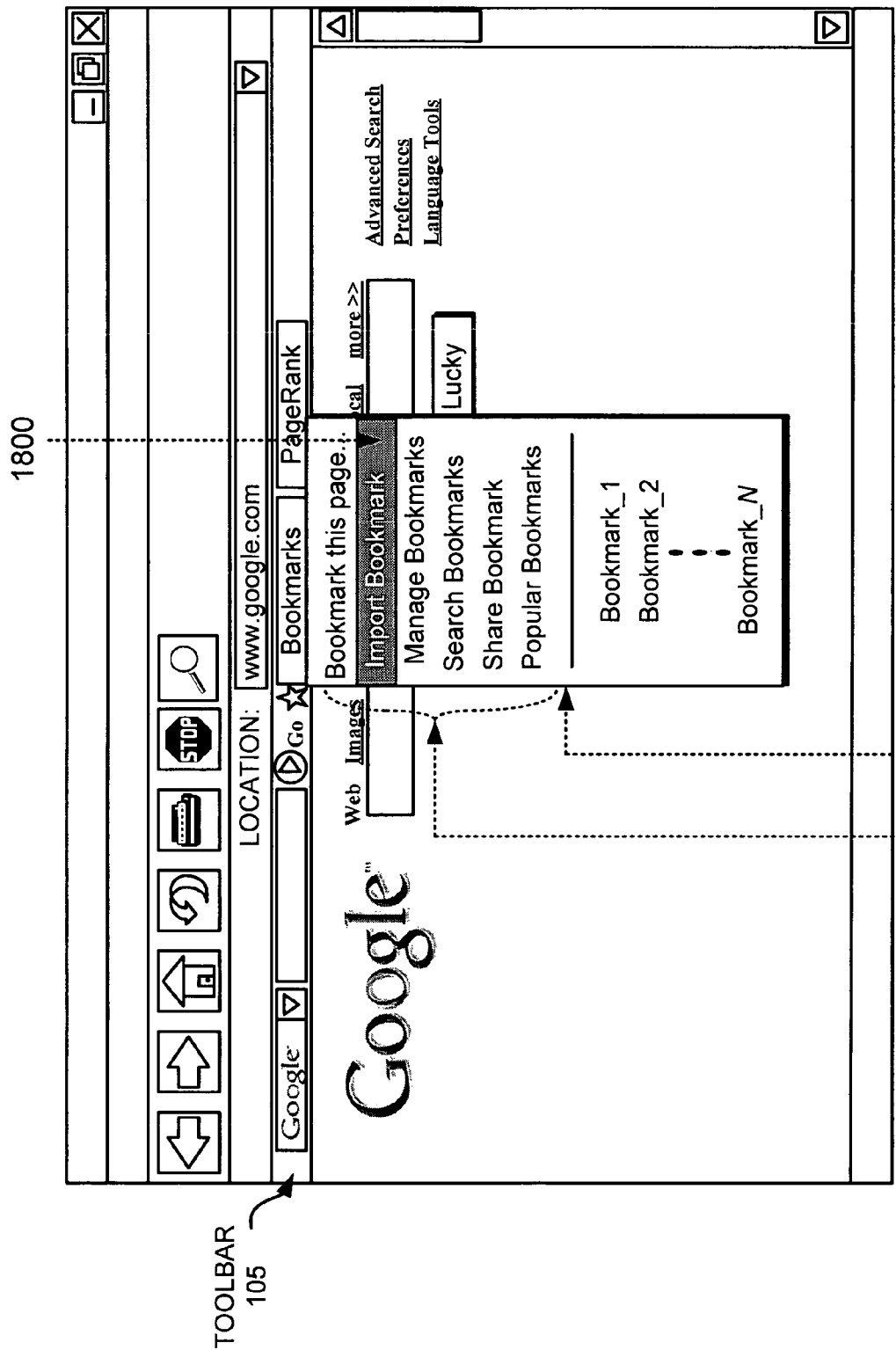

Toolbar 105 may determine whether "import bookmarks" has been selected from window 420 of toolbar 105 (block 650). If not, the exemplary process may continue at block 656 below. For example, as shown in FIG. 18, the user may select "import bookmark" 1800 from window 420. If "import bookmarks" has been selected from window 420, then toolbar 105 may retrieve bookmarks or favorites from the client's browser (block 652). For example, the client may include the Internet Explorer browser, and toolbar 105 may retrieve the favorites stored in association with the Internet Explorer browser. Toolbar 105 may send the imported browser bookmarks or favorites to server 130 for storage in the user's bookmark records (block 654).

Figure 19:
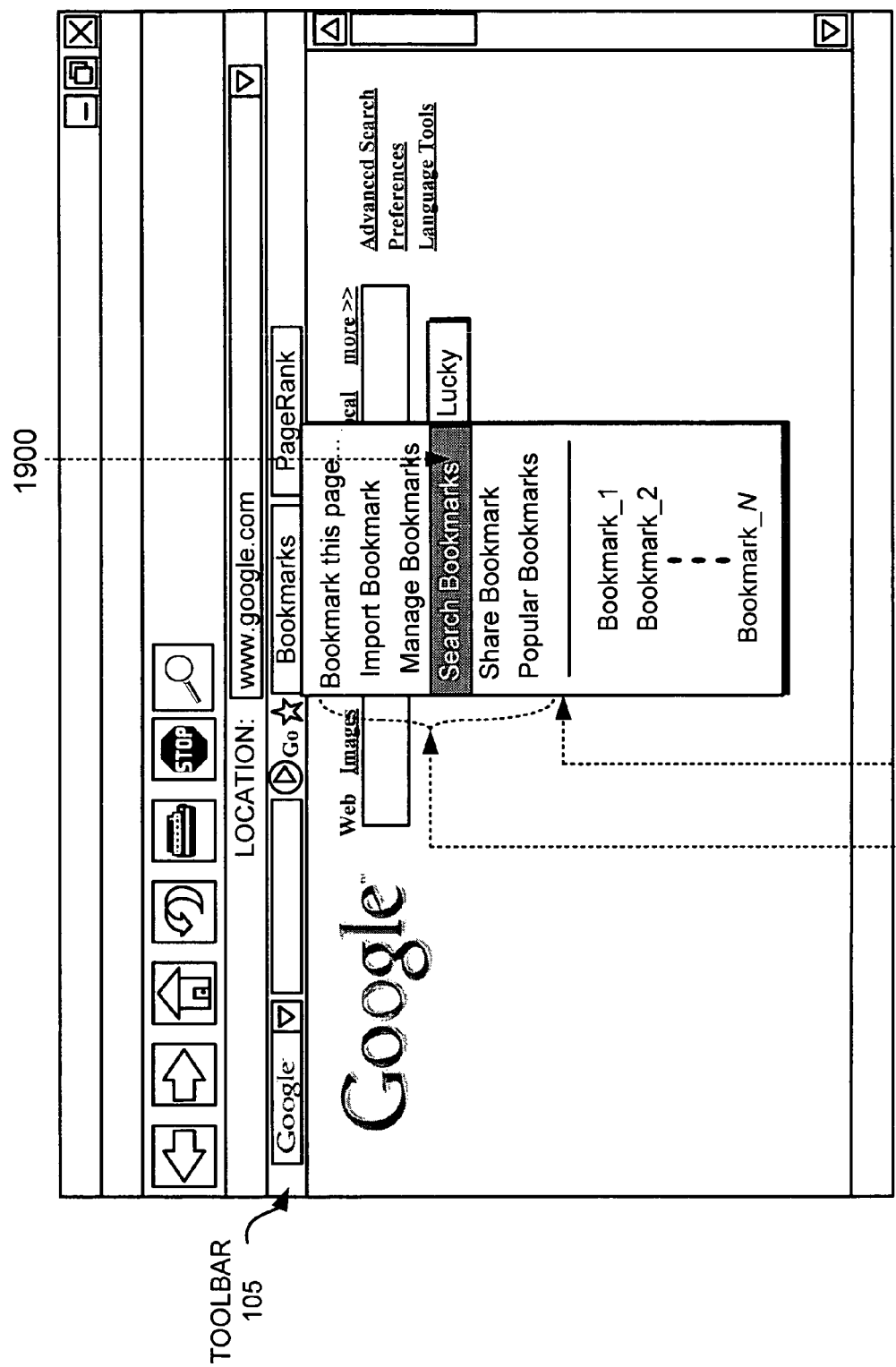
Figure 20:
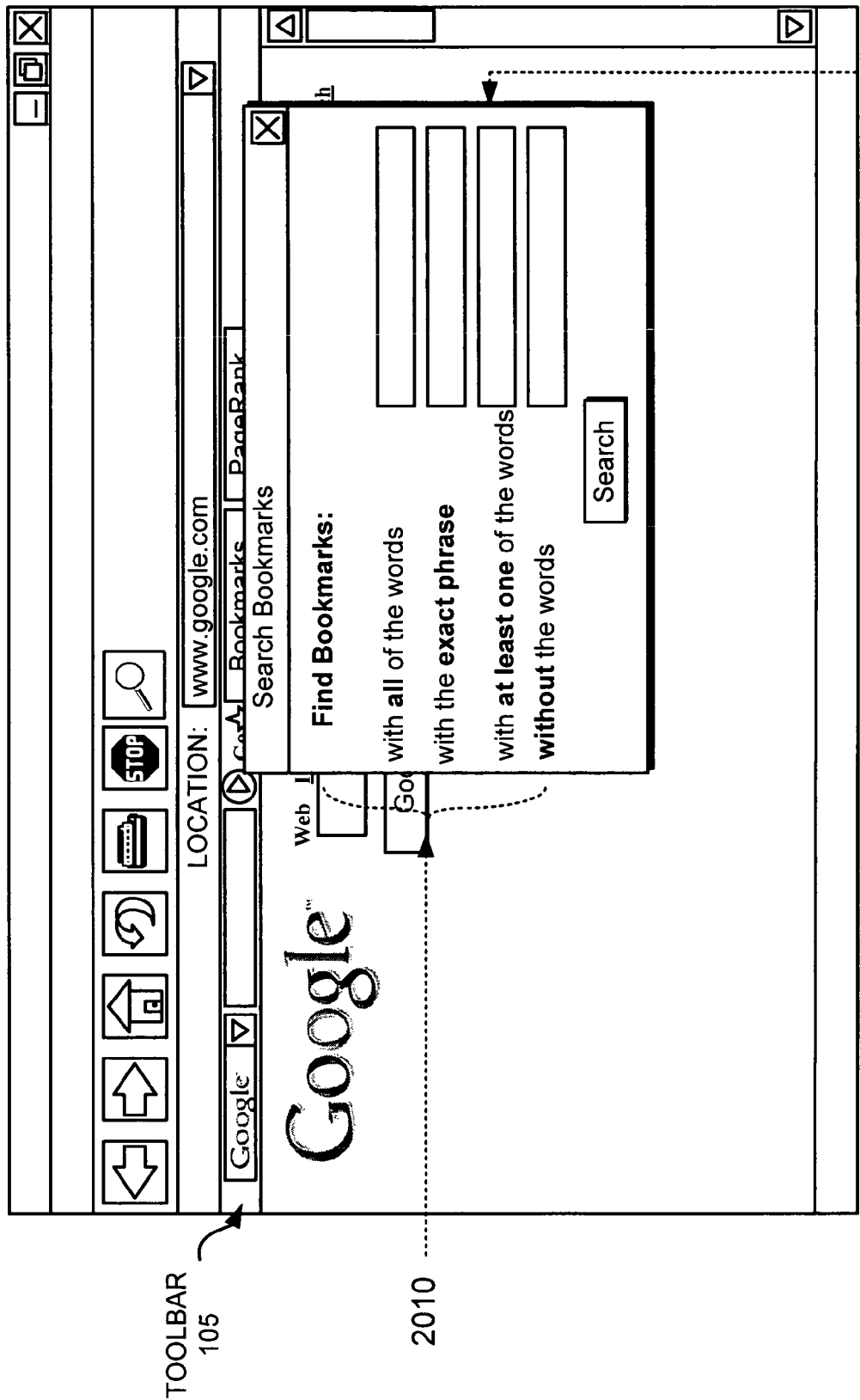

Toolbar 105 may determine whether "search bookmarks" has been selected from window 420 of toolbar 105 (block 656). If not, the exemplary process may continue at block 668 below. For example, as shown in FIG. 19, the user may select "search bookmarks" 1900 from window 420. If "search bookmarks" has been selected from window 420, then toolbar 105 may display a search query window to the user (block 658). FIG. 20 illustrates an exemplary "search bookmarks" window 2000 that may be displayed by toolbar 105. Window 2000 may include various search fields 2010 for entering one or more words or phrases of a search query. Toolbar 105 may receive a search query from the user via the search query window (block 660). For example, the user may enter one or more search terms or phrases in the search fields 2010 of window 2000. Toolbar 105 may send the bookmark search query to server 130 for execution of a search of the user's bookmarks in bookmark records 140 stored at the server (block 662). Toolbar 105 may receive one or more bookmarks from server 130 based on the search query (block 664) and may display the one or more received bookmarks to the user (block 666).

Figure 21:
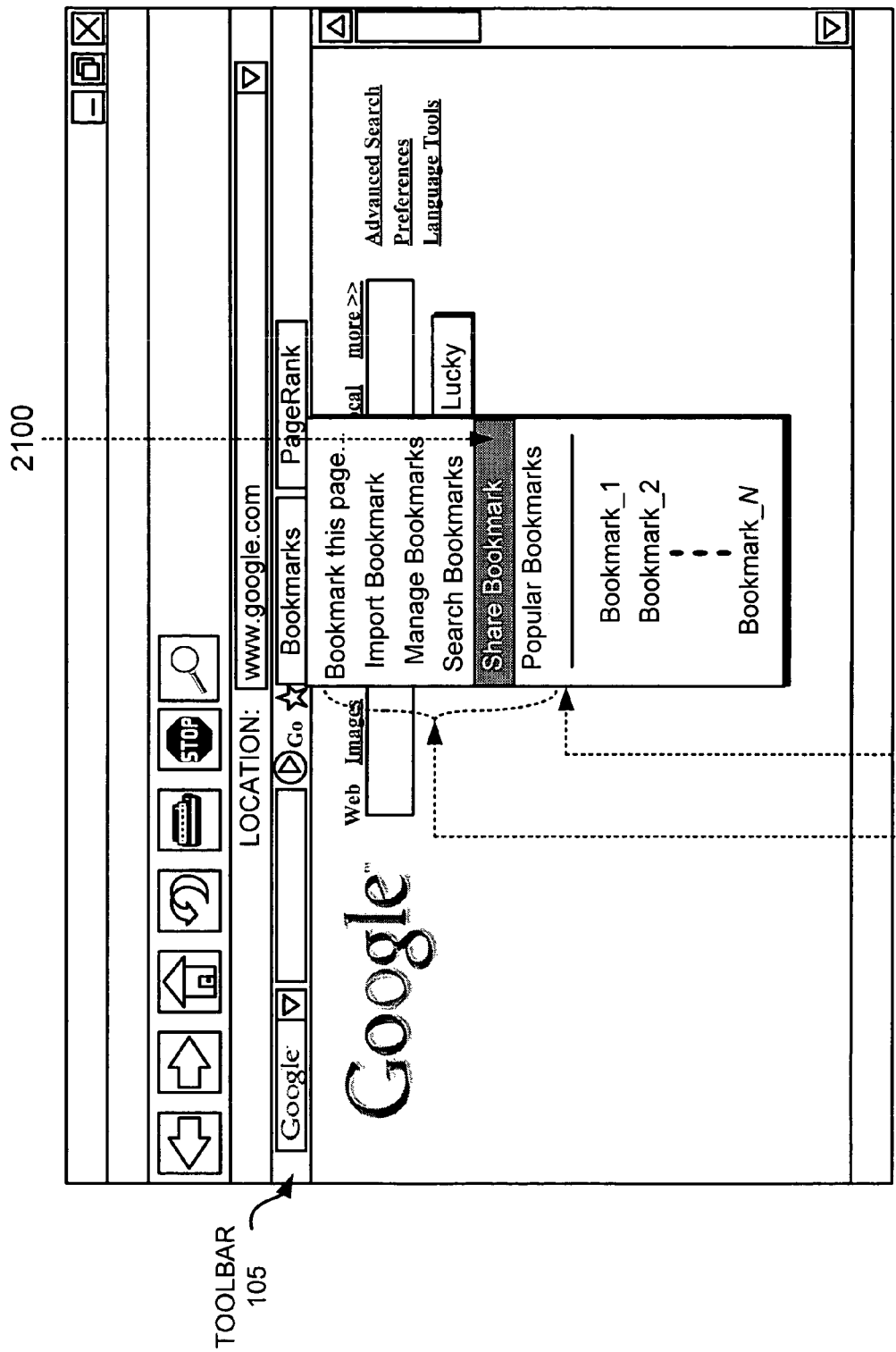
Figure 22:
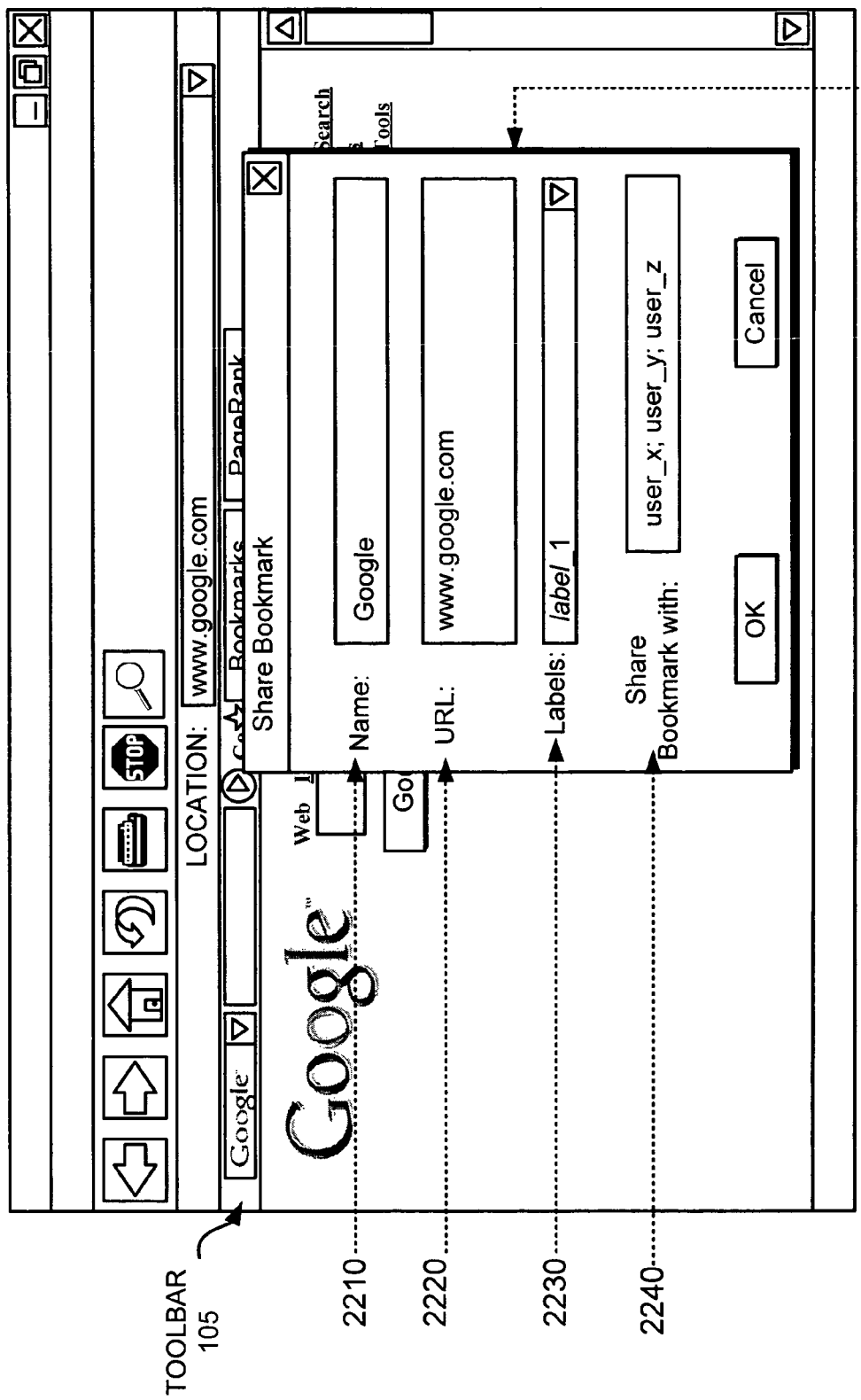

Toolbar 105 may determine whether "share bookmark" has been selected from window 420 of toolbar 105 (block 668). If not, the exemplary process may continue at block 676 below. For example, as shown in FIG. 21, the user may select "share bookmark" 2100 from window 420. If "share bookmark" has been selected from window 420, then toolbar 105 may receive an identification of the bookmark to be shared (block 670). FIG. 22 illustrates an exemplary "share bookmark" window 2200 for identifying a bookmark that the user wishes to share with other users. Window 2200 may include a bookmark name field 2210, a bookmark address (e.g., URL) field 2220, a labels field 2230 and a "share bookmark with:" field 2240. The user may identify the bookmark to be shared by entering the bookmark name and/or bookmark address in fields 2210 or 2220. Toolbar 105 may further receive an identification of other users that the bookmark is to be shared with (block 672). For example, as shown in FIG. 22, the user may enter user identifications in field 2240. Toolbar 105 may send a "share bookmark" request to server 130 with an identification of the bookmark to be shared, and an identification of the other users that the bookmark is to be shared with (block 674). Server 130 may share the bookmark with the identified other users, as described below.

Figure 23:
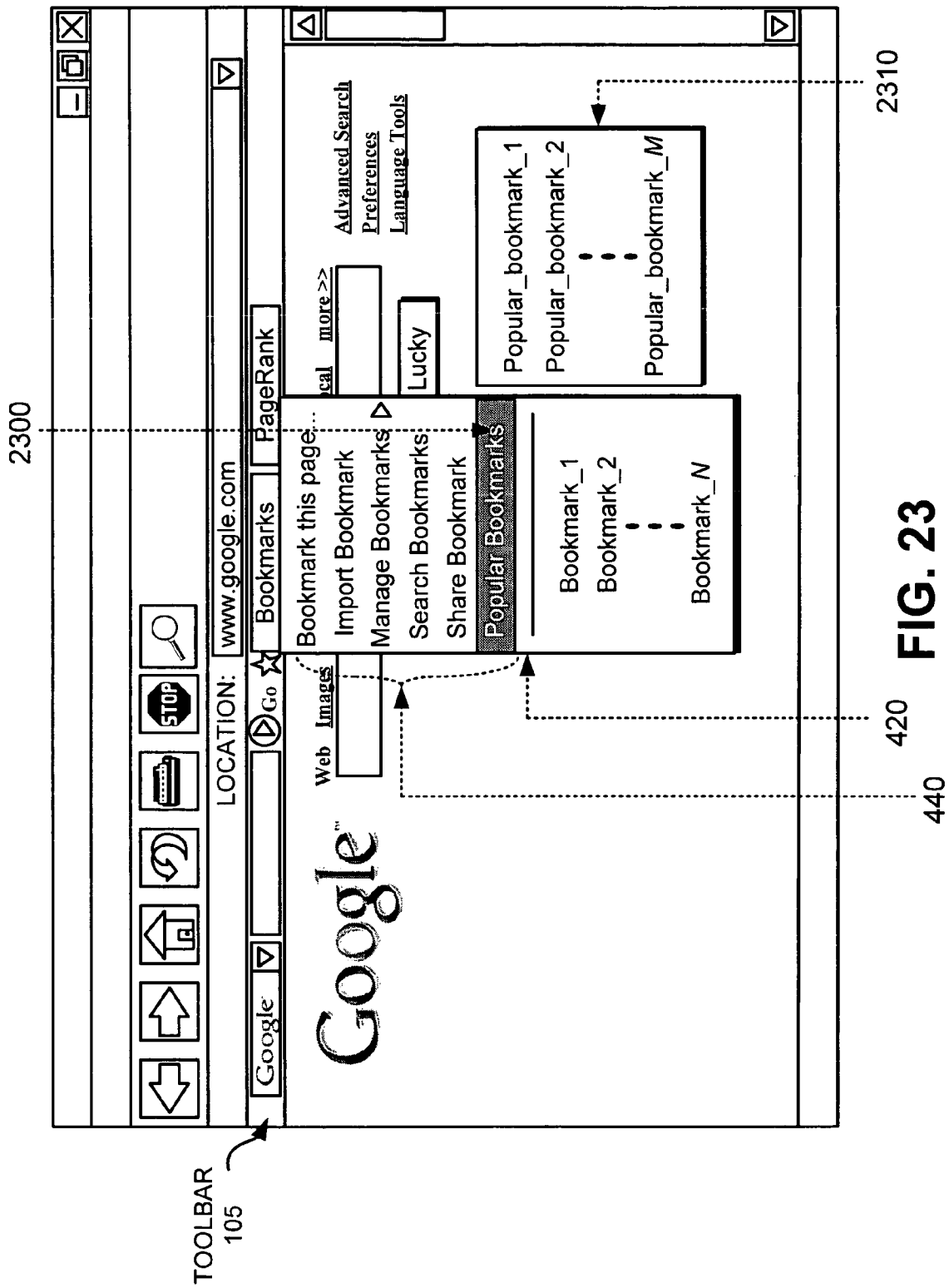

Toolbar 105 may determine whether "popular bookmarks" has been selected from window 420 of toolbar 105 (block 676). For example, as shown in FIG. 23, the user may select "popular bookmarks" 2300 from window 420. If "popular bookmarks" has been selected from window 420, toolbar 105 may send a "popular bookmarks" request to server 130 requesting a list of currently popular bookmarks among other different users (block 678). Toolbar 105 may receive a list of bookmarks from server 130 that have been identified as being popular among multiple different users (block 680). Toolbar 105 may display the list of bookmarks to the user (block 682). For example, as shown in FIG. 23, a "popular bookmarks" window 2310 may be displayed depicting the list of bookmarks received from the server 130 in response to the "popular bookmarks" request. Toolbar 105 may periodically receive a refresh of the user's bookmarks from server 130 (block 684). For the periodic refresh, toolbar 105 may request, or server 130 may send on its own initiative, an updated list of the user's current bookmarks stored in bookmark records 140. Toolbar 105 may display the updated list in window 420.

Exemplary Server Bookmark Process

FIGS. 24A-24E are a flowchart of an exemplary process for storing and managing bookmarks at server 130 consistent with principles of the invention. The process exemplified by FIGS. 24A-24E may be performed by server 130, or by another entity separate from, or in conjunction with, server 130.

Figure 25:
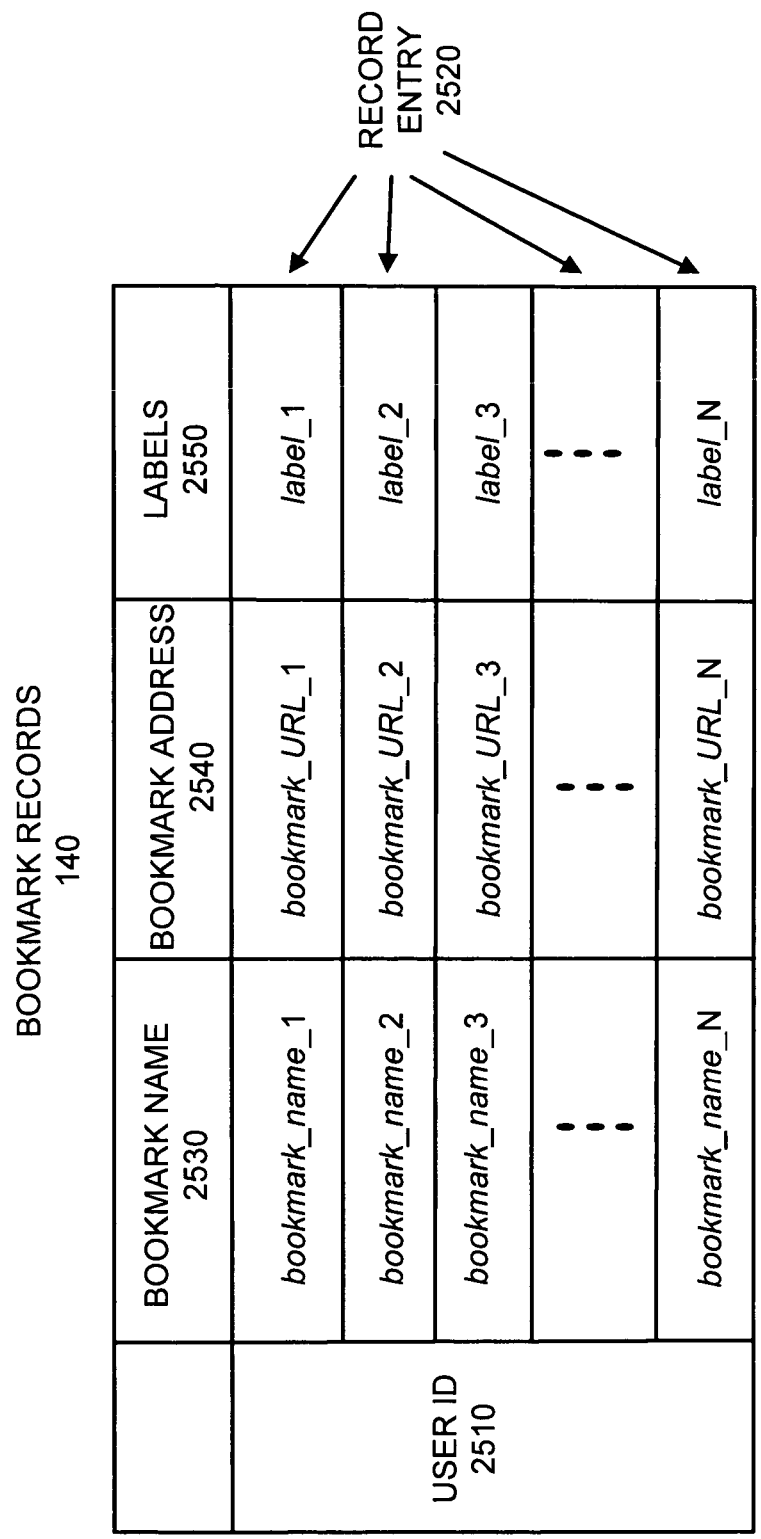
FIG. 25 is a diagram of exemplary bookmark records associated with server 130 of FIG. 2 consistent with principles of the invention.

The exemplary process may begin with a user logging into server 130 and the receipt of a "list bookmarks" request from client 205 when the user logs into server 130 (block 2400). Server 130 may send the user's current bookmark records to client 205 (block 2403) in response to the "list bookmarks" request. FIG. 25 illustrates exemplary bookmark records 140 consistent with principles of the invention. Bookmark records 140 may include bookmarks received from one or more users, with each user being identified by a different, unique user identifier (ID) 2510. User ID 2510 may include, for example, an Internet Protocol (IP) address associated with a user, a user log-in identifier, or any other type of unique data for identifying the user. As shown in FIG. 25, each user ID 2510 may have one or more record entries 2520 associated with it. Each record entry 2520 may include a bookmark name 2530, a bookmark address 2540, and one or more labels 2550. Bookmark name 2530 may include any name designated by the user for the particular bookmark. For example, if a user bookmarks the document www.google.com, the user may name the bookmark "Google." Bookmark address 2540 may include the address (e.g., URL) of the document bookmarked by the user. Labels 2550 may include one or more different designated textual labels given by the user to the bookmark. When a "list bookmarks" request is received from the user, the user ID 2510 associated with the user is used to retrieve associated record entries 2520 from bookmark records 140. Server 130 may send the bookmark records associated with the user to the client that the user has logged in at such that the user may use the user's bookmarks at that particular client.

Returning to FIG. 24A, a determination may be made whether an "add bookmark" request has been received by server 130 from the user at client 205 (block 2409). The "add bookmark" request may include a bookmark name 2530, a bookmark address 2540 and labels 2550. If an "add bookmark" request has not been received, the exemplary process may continue at block 2415. If an "add bookmark" request has been received, then server 130 may store the bookmark contained in the request in the user's bookmark records (block 2412). For example, server 130 may store the received bookmark name 2530, bookmark address 2540 and labels 2550 in a new record entry 820 of bookmark records 140 associated with the user's user ID 810.

A determination may then be made whether an "edit bookmark" request has been received by server 130 from the user at client 205 (block 2415). The "edit bookmark" request may include an edited bookmark name 2530, bookmark address 2540 and/or labels 2550 of the edited bookmark. If an "edit bookmark" request has not been received, the exemplary process may continue at block 2421 below. If an "edit bookmark" request has been received by server 130, then server 130 may edit the corresponding bookmark data in the user's bookmark records (block 2418). For example, server 130 may replace the corresponding record entry 2520 in bookmark records 140 with the bookmark name 2530, bookmark address 2540 and/or labels 2550 received from client 205.

A determination may be made whether a "delete bookmark" request has been received by server 130 from the user at client 205 (block 2421). The "delete bookmark" request may include a bookmark name, a bookmark address and/or labels. If a "delete bookmark" request is not received, then the exemplary process may continue at block 2427 below. If a "delete bookmark" request has been received, then server 130 may delete the corresponding bookmark from the user's bookmark records (block 2424). For example, server 130 may delete the record entry 2520 of bookmark records 140 whose bookmark name 2530, bookmark address 2540 or labels 2550 corresponds to the bookmark name, bookmark address and/or labels contained in the "delete bookmark" request.

A determination may be made whether a "rename label" request has been received by server 130 from the user at client 205 (block 2427). The "rename label" request may include an old name for a bookmark along with a new name for the bookmark. If a "rename label" request is not received, the exemplary process may continue at block 2433 below. If a "rename label" request has been received, then server 130 may rename the corresponding label in the user's bookmark records (block 2430). For example, server 130 may insert the new bookmark label in the bookmark labels 2550 of a record entry 2520 of bookmark records 140 that includes a current bookmark label that matches the old bookmark label contained in the "rename label" request.

A determination may further be made whether a "remove label" request has been received by server 130 from the user at client 205 (block 2433). The "remove label" request may include the label that the user wishes removed from the user's bookmark records. If a "remove label" is not received, the exemplary process may continue at block 2437 below. If a "remove label" request has been received, then the corresponding label may be removed from the user's bookmark records (block 2435).

A determination may be made whether a "refresh bookmarks" request has been received (block 2437). The "refresh bookmarks" request may identify the user from which the request originates (e.g., the user's user ID 2510). If a "refresh bookmarks" request has not been received, then the exemplary process may continue at block 2443 below. If a "refresh bookmarks" request has been received, then the user's bookmark records may be sent to client 205 (block 2440). For example, record entries 2520 associated with the user's user ID 2510 may retrieved from bookmark records 140 by server 130 and then sent to the user at client 205.

A determination may be made whether an "import bookmarks" request has been received by server 130 from the user at client 205 (block 2443). The "import bookmarks" request may include a set of bookmarks corresponding to "bookmarks" or "favorites" stored in associated with a browser at client 205. For example, a browser, such as Internet Explorer, may store URLs of documents identified by a user as being the user's "favorites." If an "import bookmarks" request has not been received, then the exemplary process may continue at block 2446 below. If an "import bookmarks" request has been received, then server 130 may store the bookmarks retrieved from a set of bookmarks or favorites of a browser at client 205 (block 2446). Prior to storage, server 130 may convert the imported bookmarks received from client 205 into a format usable by server 130. For example, "favorites" in the Internet Explorer (IE) browser are organized by hierarchical folder, with each "favorite" existing only in one folder. These "favorites" can be converted by server 130 by changing the IE folder designations into bookmark labels (e.g., a "favorites" stored in folders "Finance/Accounts" may be converted to a label "finance-accounts). Imported bookmarks, thus, may be automatically labeled by converting the hierarchical folders in which a given "favorite" or bookmark is associated with in the client browser to a label assigned to the bookmark.

A determination may be made whether a "search bookmarks" request has been received by server 130 from the user at client 205 (block 2449). The "search bookmarks" request may include a search query (e.g., a set of search terms) that server 130 may use to search through the user's bookmark records for bookmarks that are relevant to the search query. If a "search bookmarks" request has not been received, the exemplary process may continue at block 2455 below. If a "search bookmarks" request has been received, then server 130 may search the user's bookmark records based on the search query contained in the "search bookmarks" request (block 2452) and return a list of bookmarks that match the search query to the user at client 205. The search query may be used to search bookmark names, bookmark addresses, and bookmark labels associated with the user's stored bookmarks. The search query may further search content of the documents associated with each stored bookmark.

A determination may be made whether a "share bookmark" request has been received by server 130 from the user at client 205 (block 2455). The "share bookmark" request may identify the user or users that the bookmarks should be shared with, and may identify each of the bookmarks that are desired to be shared (e.g., identified by bookmark name 2530). If a "share bookmark" request has not been received, the exemplary process may continue at block 2461 below. If a "share bookmark" request has been received, then server 130 may share the identified bookmark(s) with other user(s) identified in the request (block 2458). For example, server 130 may retrieve the record entry 2520 that corresponds to the user's ID 2510 and bookmark name 2530 and store the data in a record entry corresponding to another user ID 2510.

A determination may be made whether a "popular bookmarks" request has been received by server 130 from the user at client 205 (block 2461). If not, the exemplary process may continue at block 2467 below. If a "popular bookmarks" request has been received, then server 130 may send a list of bookmarks identified as being popular among multiple different users to client 205 (block 2464). Server 130 may continuously, or periodically, evaluate the bookmarks received from multiple different users and stored in bookmark records 140. An analysis of bookmark records 140 may enable server 130 to identify bookmarks that are particularly popular among multiple different users.

Figure 24A:
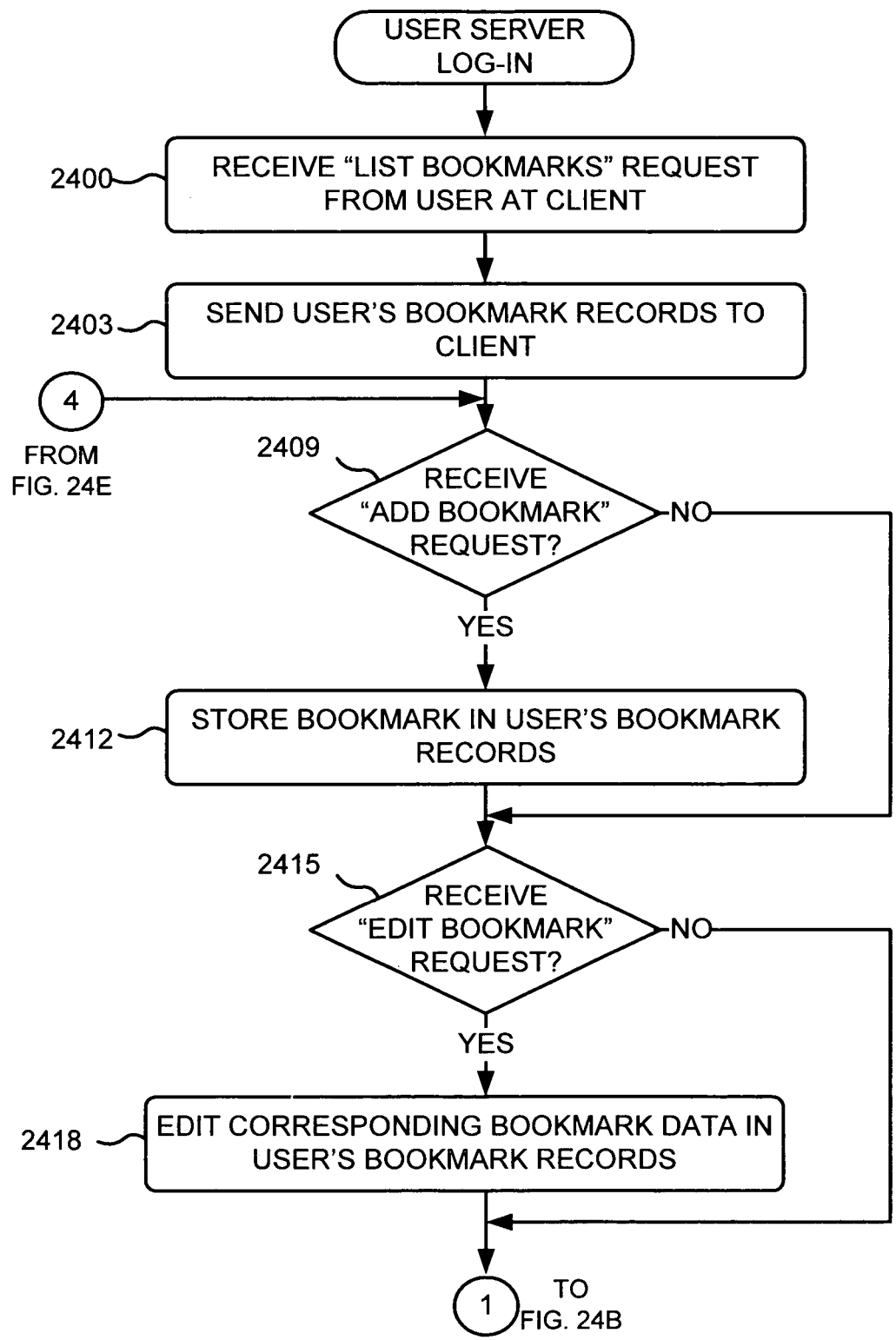
FIGS. 24A through 24E are a flowchart of an exemplary process for storing and managing bookmarks at a server consistent with principles of the invention.
Figure 24B:
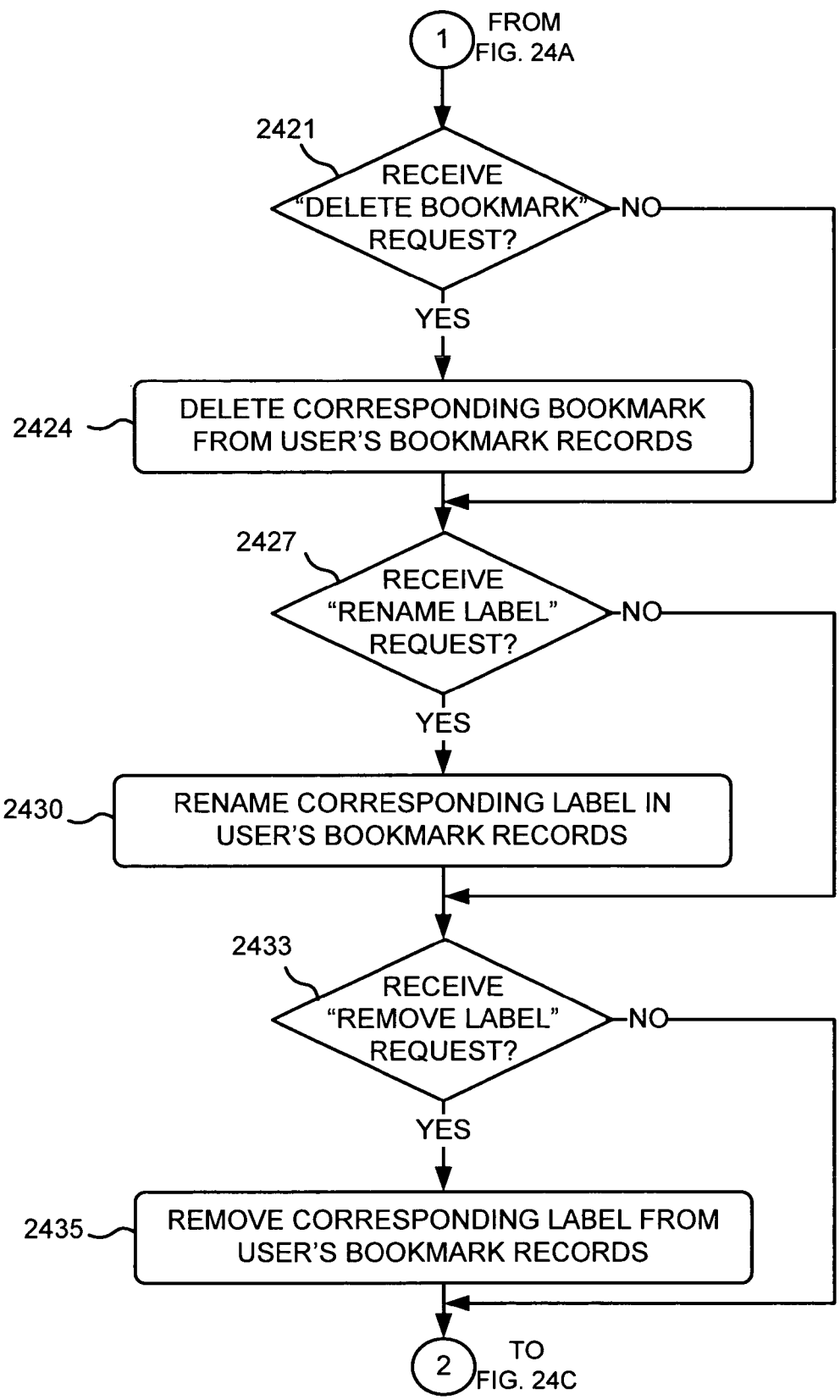
Figure 24C:
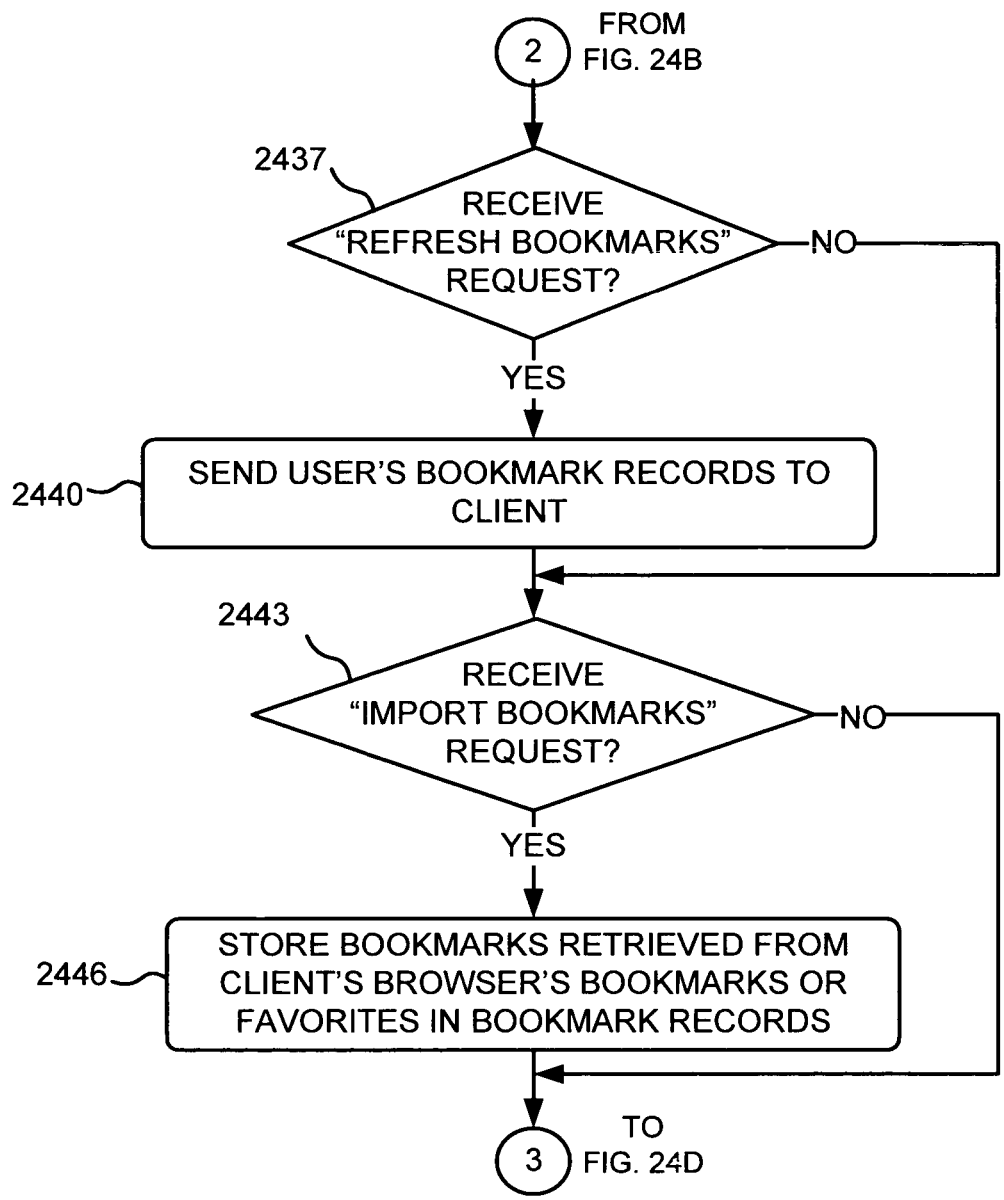
Figure 24D:
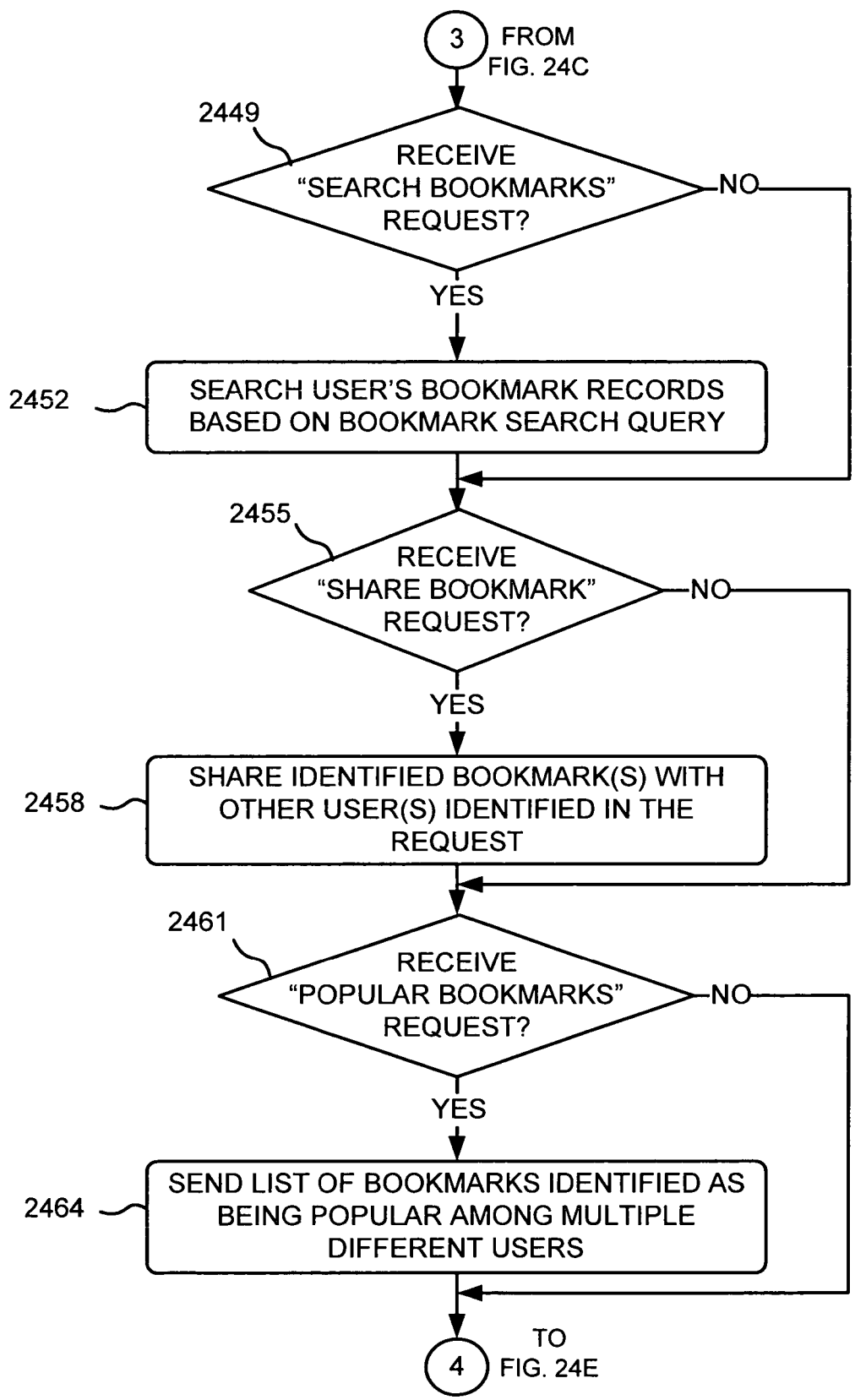
Figure 24E:
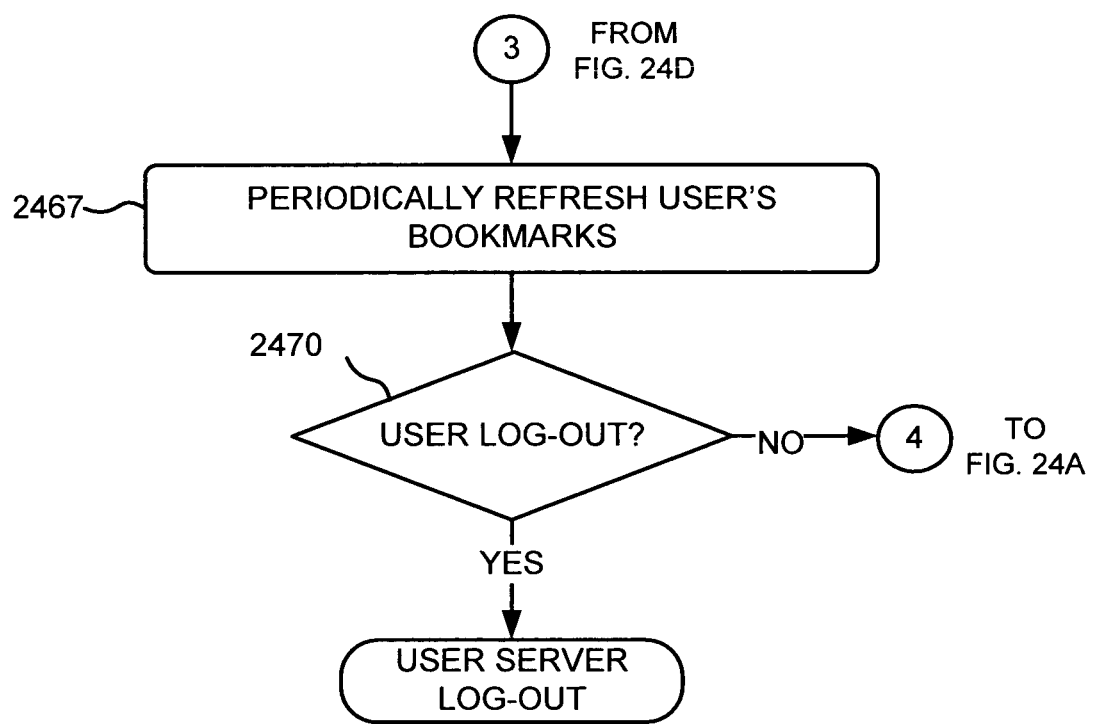

Server 130 may periodically refresh the user's bookmarks (block 2467). Refreshing the user's bookmarks may include providing a list of bookmarks associated with the user's user ID 2510 that are currently stored in bookmark records 140. Server 130 may then determine whether the use has logged-out of server 130 (block 2470). If not, then the exemplary process may continue at block 2409 (FIG. 24A). If the user logs out, then the exemplary process may terminate.

Additional Client Toolbar Implementations

Figure 26:
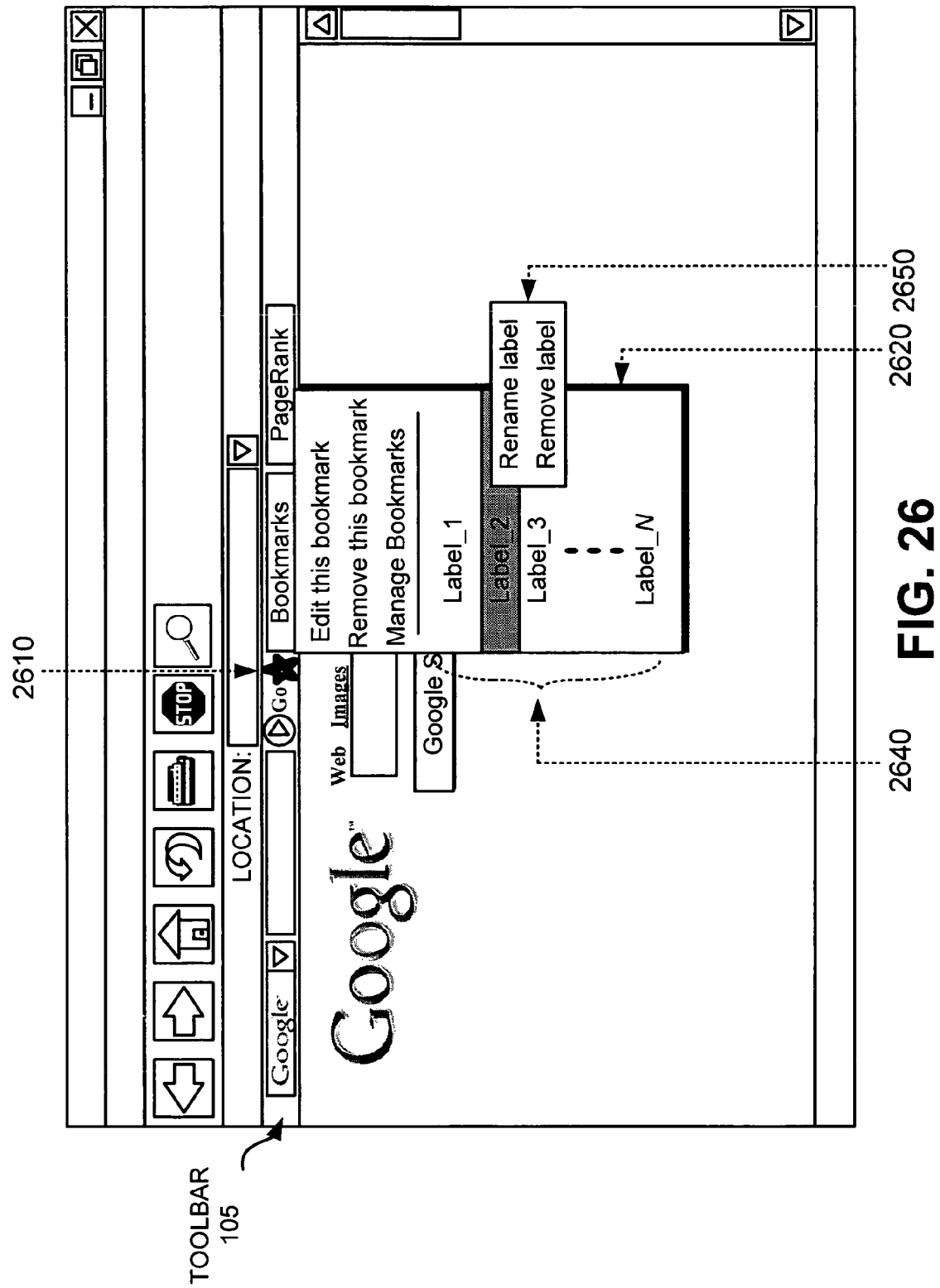
FIGS. 26-29 are diagrams that illustrate additional exemplary implementations of toolbar bookmark functionality consistent with principles of the invention.

FIG. 26 is a diagram that depicts an exemplary toolbar implementation of the invention in which a user may rename or remove labels associated with a current document displayed in the browser. As shown, a bookmark icon 2610 displayed on toolbar 105 may indicate whether a current document displayed in the browser has previously been bookmarked or not (e.g., if the current displayed document www.google.com has previously been bookmarked, bookmark icon 2610 may be highlighted in bold, or with a different color). If the current document displayed in the browser has previously been bookmarked, and the user selects bookmark icon 2610, then a toolbar window 2620 may be displayed that includes a list of labels 2640 that have been previously assigned by the user to the document displayed in the browser. By selecting one of the labels of the list 2640 (e.g., by a "mouse-over"), another window 2650 may be displayed in the toolbar that, upon selection by the user, permits the user to rename or remove the selected label.

Figure 27:
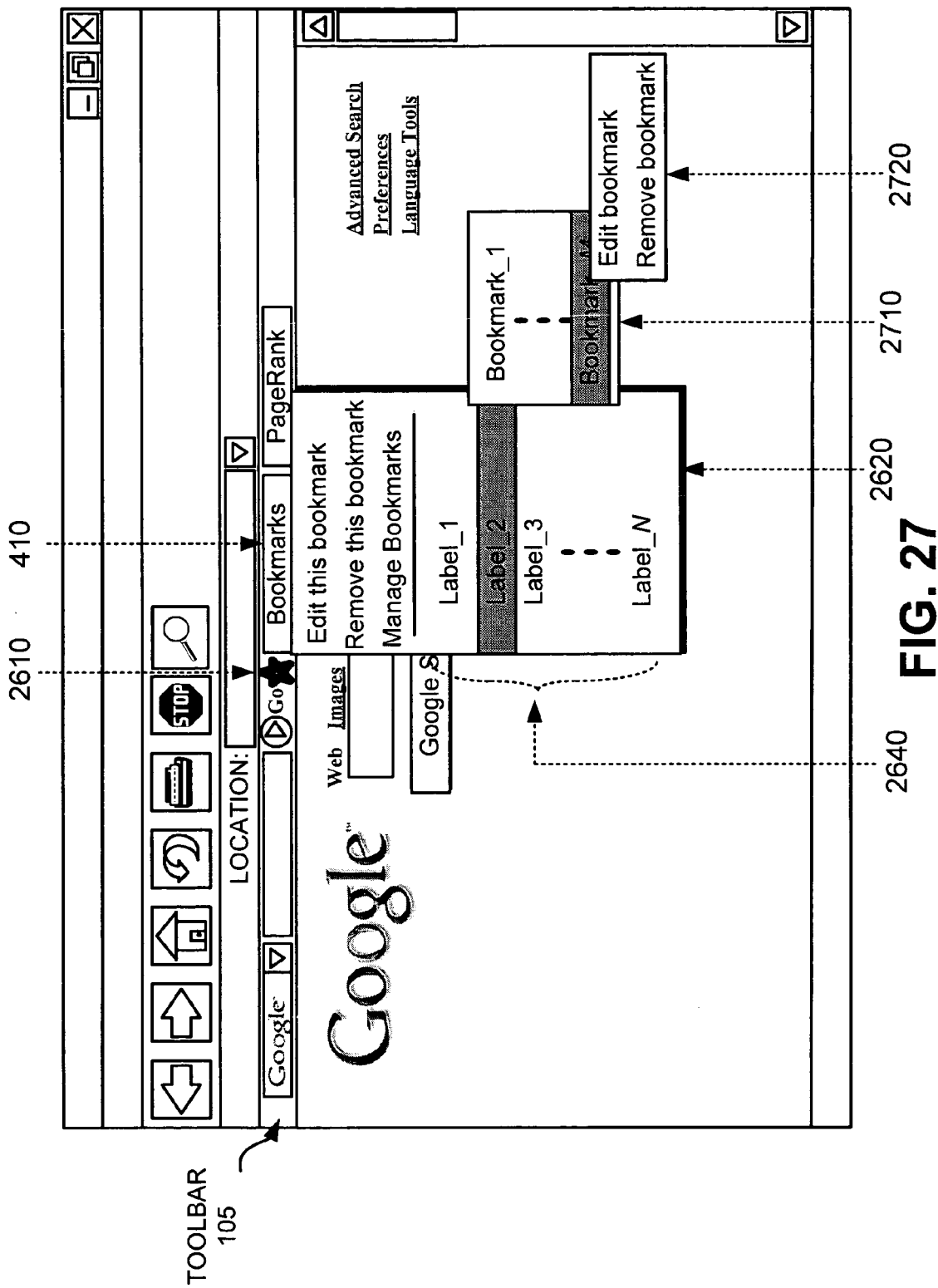

FIG. 27 is a diagram that illustrates another exemplary toolbar implementation of the invention in which bookmarks may be retrieved and edited using their corresponding labels. As shown, a user may select either bookmark icon 2610 or bookmark button 410. In response to this selection, toolbar window 2620 may be displayed that includes label list 2640. By selecting one of the labels of list 2640 (e.g., by a "mouse-over"), another window 2710 may be displayed that lists all of the bookmarks that have been assigned the selected label by the user. The user may then select a bookmark from window 2710 (e.g., by a "mouse-over") and a further window 2730 may be displayed that includes a list of bookmark management options that may be selected by the user. For example, window 2720 may include an "edit bookmark" option and a "remove bookmark" option. If the user selects "edit bookmark" from window 2720, then the bookmark selected by the user from window 2710 may be edited (e.g., similar to FIG. 10 above). If the user selects "remove bookmark" from window 2720, then the bookmark selected by the user from window 2710 may be removed from the user's bookmarks.

Figure 28:
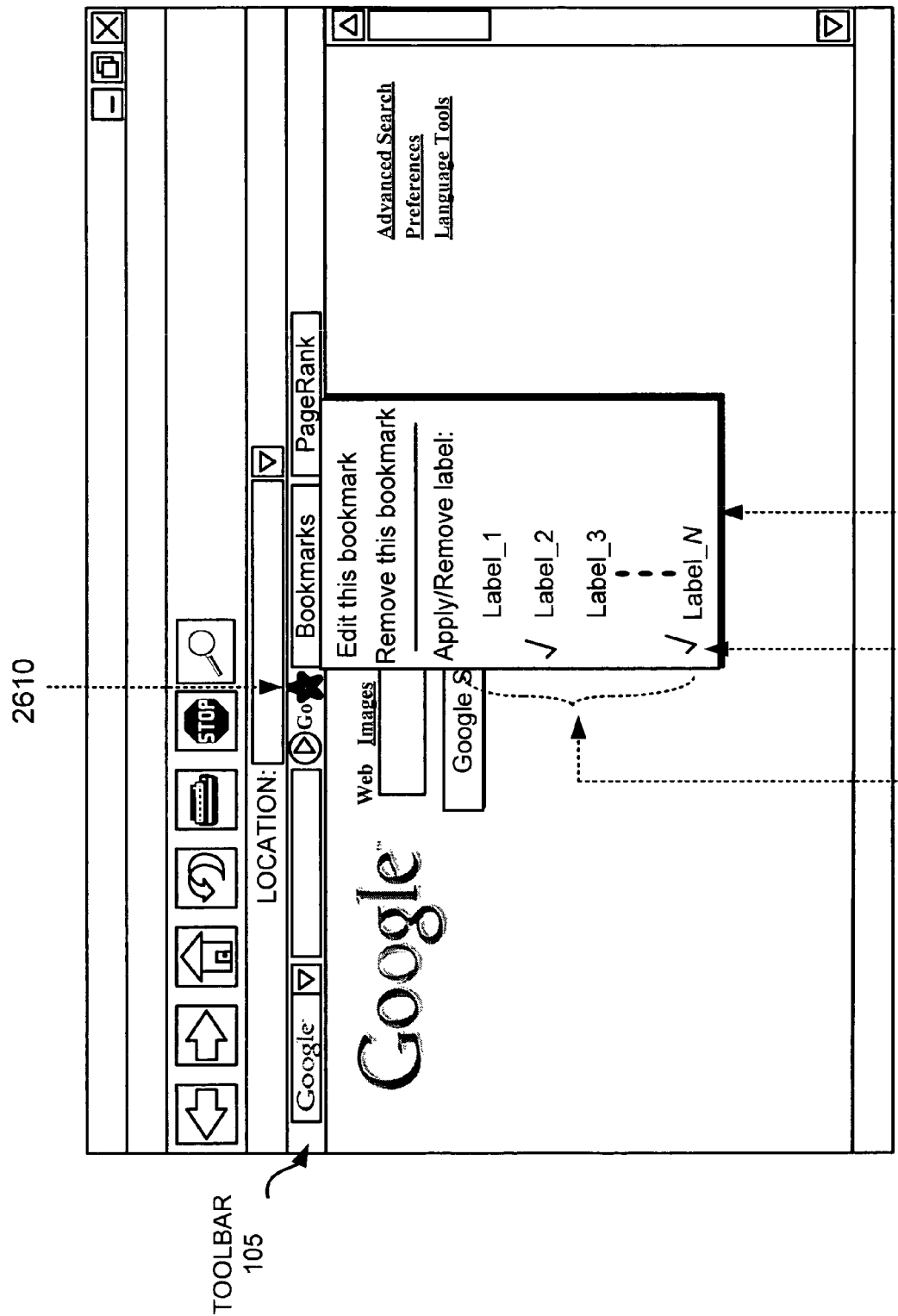

FIG. 28 is a diagram that illustrates a further exemplary toolbar implementation of the invention in which a list of labels may be used to apply or remove labels to a given document displayed in a browser. Upon selection of bookmark icon 2610, toolbar window 2620 may be displayed that includes a list of labels 2810 that have been previously been assigned to other documents, and to the document currently displayed in the browser. Each label of list 2810 that is currently assigned to the document currently displayed in the browser may have a designator 2820 (e.g., a check mark) next to it indicating that this label is currently assigned to the document displayed in the browser. A user may, thus, by selecting labels in list 2810 apply one or more selected labels to the document displayed in the browser, or may remove one or more labels previously assigned to the document displayed in the browser.

Figure 29:
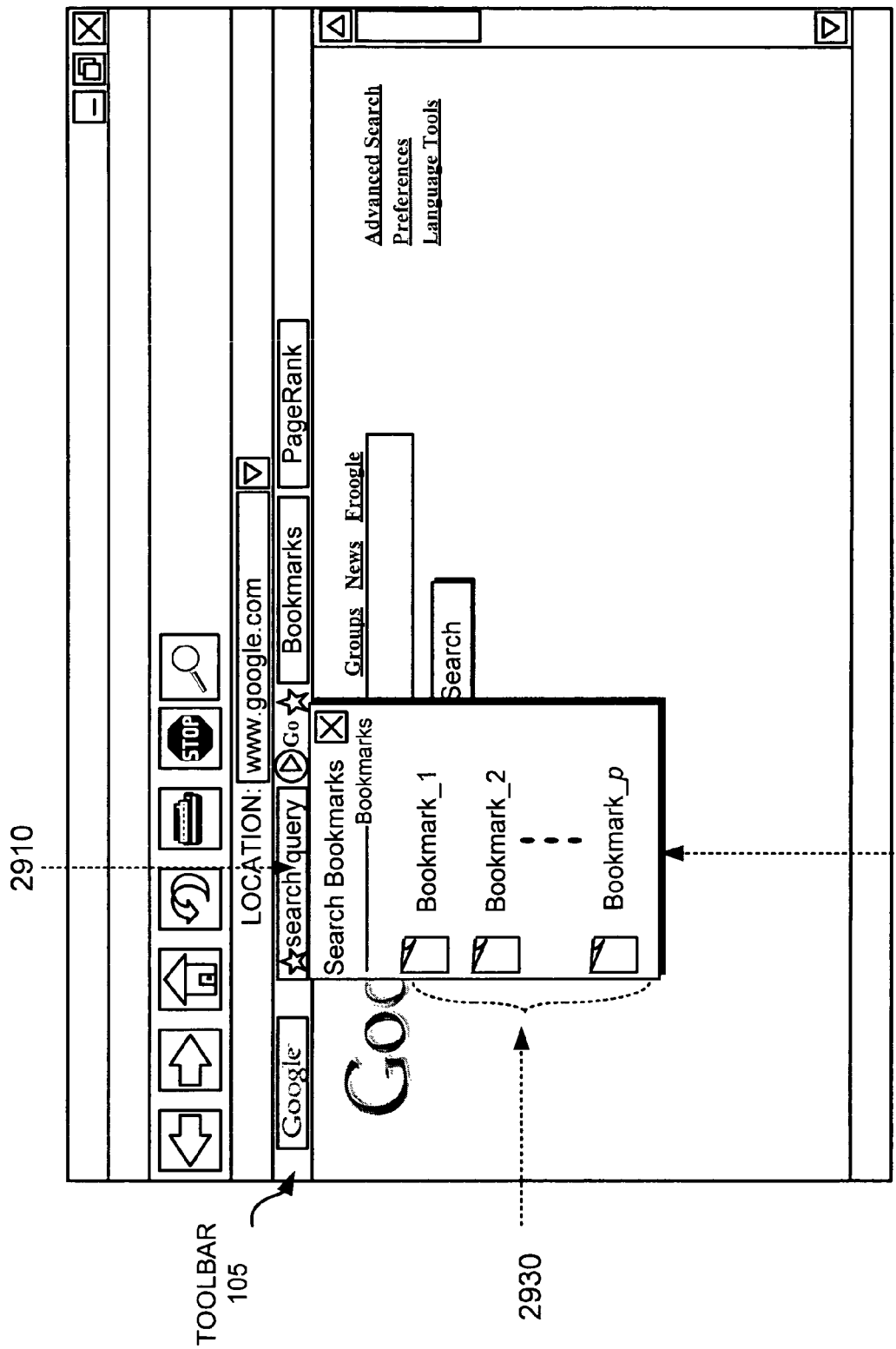

FIG. 29 is a diagram that illustrates an additional exemplary toolbar implementation of the invention in which a user may use a search box in toolbar 105 for searching the user's bookmarks. As shown, a user may enter a search query in a search box 2910 of toolbar 105, and the search query may be used to search the user's bookmarks. As a result of the bookmark search, a bookmark search result window 2920 may be displayed that includes a list of bookmarks 2930 that match the search query entered into search box 2910 of toolbar 105.

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 6A-6G and 24A-24E, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
    receiving, by one of the one or more server devices, bookmarks that identify documents from a user at a first client;
    storing the bookmarks in a data structure of a memory associated with the one or more server devices;
    receiving, by one of the one or more server devices, a request from the user to search the stored bookmarks; and
    searching, by a processor associated with the one or more server devices, a content of a document associated with one of the stored bookmarks based on the request to search the stored bookmarks.

2. The method of claim 1, further comprising:
    searching the stored bookmarks based on the request from the user to search the bookmarks.

3. The method of claim 1, further comprising:
    providing the bookmarks from the server device to a second client for use by the user.

4. The method of claim 1, where the bookmarks identify documents browsed by the user at the first client.

5. The method of claim 1, further comprising:
    sharing the stored bookmarks with other users based on a request by the user.

6. The method of claim 1, further comprising:
    editing one or more of the stored bookmarks based on a request from the user.

7. The method of claim 1, further comprising:
    importing one or more of the bookmarks from bookmarks or favorites associated with a browser at the first client; and
    storing the imported bookmarks in the data structure associated with the server.

8. A method performed by one or more server devices, the method comprising:
    importing, by a processor associated with the one or more server devices, bookmarks or favorites associated with documents from a browser at a first client;
    storing, in a memory associated with the one or more server devices, the imported bookmarks or favorites at a remote server;
    receiving, by one of the one or more server devices, a request, from a user, to search the stored bookmarks or favorites;
    searching, by a processor associated with the one or more server devices, the stored bookmarks in response to receiving the request; and
    searching, by a processor associated with the one or more server devices, a content of the documents associated with the stored bookmarks or favorites in response to receiving the request.

9. The method of claim 8, further comprising:
    providing the imported bookmarks or favorites to a second client from the remote server.

10. A non-transitory computer-readable medium storing instructions, the instructions comprising:
    one or more instructions to receive bookmarks, that identify documents, from a first user at a first client;
    one or more instructions to store the bookmarks in a data structure associated with the first user,
        where the data structure comprises a user identification string and one or more record entries for the received bookmarks;
    one or more instructions to import one or more of the bookmarks from bookmarks or favorites associated with a browser at the first client;
    one or more instructions to store the imported bookmarks in the data structure associated with the server;
    one or more instructions to search the stored bookmarks based on a request from the first user to search the stored bookmarks;
    one or more instructions to search a content of documents associated with the stored bookmarks based on the request to search the stored bookmarks;
    one or more instructions to provide, to the first user, at least one first entry box to receive information identifying a bookmark to share with a second user;
    one or more instructions to provide a second entry box for receiving information identifying the second user;
    one or more instructions to receive, from the first user, an identified bookmark via the first entry box and an identified second user via the second entry box;
    one or more instructions to retrieve a record entry associated with the identified bookmark from the data structure associated with the first user; and
    one or more instructions to store the record entry associated with the identified bookmark in a data structure associated with the identified second user.

11. A method performed by a client device, the method comprising:
    sending, by a communication interface or an output device of the client device, multiple bookmarks from the client device to a server for storage of the bookmarks at the server; and
    providing, by a processor of the client device, a toolbar in a browser at the client device that permits a first user to manage, search, and share the multiple bookmarks with a second user by receiving information identifying the second user from the first user,
    where the providing includes:
        providing at least one first entry box to receive information identifying a bookmark to share with the second user; and
        providing a second entry box for receiving information identifying the second user.

12. The non-transitory computer-readable medium of claim 10, where the instructions further include:
    one or more instructions to provide a user interface for editing the bookmarks in the data structure.

13. The non-transitory computer-readable medium of claim 10, where the instructions further include:
    one or more instructions to provide a user interface for renaming labels in the bookmarks in the data structure.

14. The method of claim 11, further comprising:
    searching the stored bookmarks based on a search request from the user.

15. The method of claim 14, further comprising:
    searching a content of documents associated with the stored bookmarks based on the search request.

* * * * *